US010425179B2

(12) United States Patent
Mitton, Jr. et al.

(10) Patent No.: US 10,425,179 B2
(45) Date of Patent: Sep. 24, 2019

(54) WIRELESS COMMUNICATION STATION

(71) Applicant: Altaeros Energies, Inc., Somerville, MA (US)

(72) Inventors: Peter Carleton Mitton, Jr., Brookline, MA (US); Fabrice Cibangu Tshibasu, Lynn, MA (US); Joshua H. Aranov, Winthrop, MA (US); Benjamin William Glass, Somerville, MA (US); Benjamin Ryan Bollinger, Topsfield, MA (US)

(73) Assignee: Altaeros Energies, Inc., Somerville, MA (US)

( * ) Notice: Subject to any disclaimer, the term of this patent is extended or adjusted under 35 U.S.C. 154(b) by 9 days.

(21) Appl. No.: 15/706,569

(22) Filed: Sep. 15, 2017

(65) Prior Publication Data

US 2018/0083726 A1 Mar. 22, 2018

Related U.S. Application Data

(60) Provisional application No. 62/395,956, filed on Sep. 16, 2016.

(51) Int. Cl.
| | |
|---|---|
| *H04W 4/00* | (2018.01) |
| *H04J 11/00* | (2006.01) |
| *H04W 48/16* | (2009.01) |
| *H04W 72/04* | (2009.01) |
| *H04W 16/28* | (2009.01) |

(Continued)

(52) U.S. Cl.
CPC ........... *H04J 11/003* (2013.01); *H04W 16/28* (2013.01); *H04W 48/16* (2013.01); *H04W 72/0453* (2013.01); *H04W 88/085* (2013.01); *H04J 11/0053* (2013.01); *H04W 24/02* (2013.01); *H04W 52/50* (2013.01)

(58) Field of Classification Search
None
See application file for complete search history.

(56) References Cited

U.S. PATENT DOCUMENTS

| | | |
|---|---|---|
| 5,048,116 A | 9/1991 | Schaeffer |
| 6,010,093 A | 1/2000 | Paulson |
| (Continued) | | |

OTHER PUBLICATIONS

International Search Report and Written Opinion dated Jan. 5, 2018 in connection with International Application No. PCT/US2017/051819.

*Primary Examiner* — Erika A Washington

(74) *Attorney, Agent, or Firm* — Wolf, Greenfield & Sacks, P.C.

(57) ABSTRACT

According to at least one aspect, a large area wireless communication station is provided. The wireless communication station may provide mobile communication signals at distances up to 100 kilometers from the location of the station. The wireless communication station may include a plurality of antennas that are co-located and configured to each provide coverage to a portion of a coverage area and in sum to provide coverage to the entirety of the coverage area, a plurality of transmitters communicatively coupled to the plurality of antennas and configured to communicate with an external system, and a signal routing system configured to dynamically direct a radio frequency signal from any one or more of the plurality of transmitters to any one or more of the plurality of antennas.

21 Claims, 21 Drawing Sheets

(51) Int. Cl.
    *H04W 88/08*    (2009.01)
    *H04W 52/50*    (2009.01)
    *H04W 24/02*    (2009.01)

(56) References Cited

U.S. PATENT DOCUMENTS

| | | |
|---|---|---|
| 6,343,445 B1 | 2/2002 | Ryan |
| 7,443,805 B1 | 10/2008 | Bynum |
| 8,224,241 B1 | 7/2012 | Gunasekara et al. |
| 9,608,709 B1 * | 3/2017 | Kinamon ................ H04B 7/06 |
| 2002/0058535 A1 | 5/2002 | Lee |
| 2005/0250453 A1 | 11/2005 | Lastinger et al. |
| 2011/0159825 A1 | 6/2011 | Lee et al. |
| 2011/0310810 A1 | 12/2011 | Kenington et al. |
| 2013/0294537 A1 | 11/2013 | Cha et al. |
| 2015/0111614 A1 | 4/2015 | Vannithamby et al. |

* cited by examiner

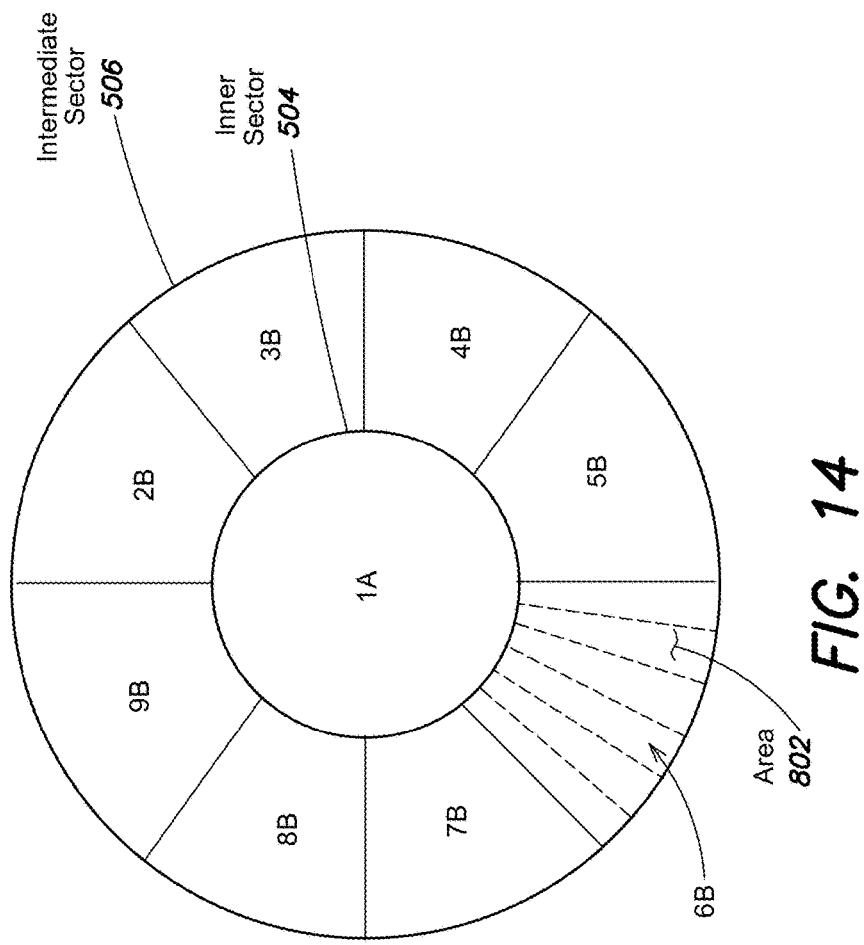

WIRELESS COMMUNICATION STATION

CROSS-REFERENCE TO RELATED APPLICATIONS

This application claims the benefit under 35 U.S.C. § 119(e) of U.S. Provisional Application Ser. No. 62/395,956, titled "WIRELESS COMMUNICATION STATION" filed on Sep. 16, 2016, which is hereby incorporated herein by reference in its entirety.

BACKGROUND

A cell tower provides cellular communication services to users within range of the cell tower. Cell towers are typically 50-150 feet tall and include antennas to wirelessly communicate with users on the ground. These cell towers may have a maximum range of around 10 kilometers. The cell towers may be arranged in a network to provide cellular service to a large geographic area.

SUMMARY

According to at least one aspect, a wireless communication station configured to provide a wireless network for one or more subscribers is provided. The communication station comprises a plurality of antennas that are co-located and configured to provide coverage for the one or more subscribers within a coverage area comprising a plurality of sectors, each of the plurality of antennas being configured to provide coverage for the one or more subscribers within at least one sector of the plurality of sectors, a plurality of transmitters each being configured to communicate with an external system and generate an RF signal, and a signal routing system coupled between the plurality of transmitters and the plurality of antennas, the signal routing system being configured to dynamically assign the plurality of transmitters to the plurality of sectors at least in part by dynamically routing the RF signal from any one of the plurality of transmitters to any one of the plurality of antennas.

In some embodiments, the signal routing system is configured to receive motion information indicative of a motion of the plurality of antennas and dynamically assign the plurality of transmitters to the plurality of sectors using the motion information. In some embodiments, at least one of the plurality of antennas is a variable geometry antenna and wherein the signal routing system is configured to control the variable geometry antenna using the motion information. In some embodiments, the wireless communication station further comprises a gimbal drive mechanism configured to rotate at least one of the plurality of antennas about at least one axis and wherein the signal routing system is configured to control the gimbal mechanism using the motion information.

In some embodiments, at least one of the plurality of antennas is a variable geometry antenna and wherein the signal routing system is configured to control the variable geometry antenna. In some embodiments, the signal routing system is configured to control the variable geometry antenna to change a characteristic of at least one sector of the plurality of sectors, the characteristic of the at least one sector being selected from the group consisting of: a size of the at least one sector, a shape of the at least one sector, and a position of the at least one sector. In some embodiments, the signal routing system is configured to receive subscriber information indicative of a movement of a subscriber of the one or more subscribers and control the variable geometry antenna using the subscriber information.

In some embodiments, the signal routing system is configured to receive network information indicative of at least one state of the wireless network and dynamically assign the plurality of transmitters to the plurality of sectors using the network information. In some embodiments, the at least one state of the wireless network comprises a state selected from the group consisting of: a number of subscribers in at least one sector of the plurality of sectors, a number of transmitters assigned to the at least one sector, a total number of subscribers on the wireless network, an average data throughput, a sector handover rate, a rate at which subscribers are being added to the wireless network, a rate at which subscribers are leaving the wireless network, a modulation scheme employed by the wireless network, a performance of at least one component of the wireless communication system, and a resource block allocation.

In some embodiments, the signal routing system comprises a signal routing controller configured to identify a mapping of at least one transmitter of the plurality of transmitters to at least one antenna of the plurality of antennas and generate a control signal based on the identified mapping and a signal routing actuator configured to dynamically route the RF signal from at least one transmitter of the plurality of transmitters to at least one antenna of the plurality of antennas based on a received control signal. In some embodiments, the at least one antenna is a multi-beam antenna configured to generate a plurality of RF beams and wherein the signal routing controller is configured to identify the mapping at least in part by identifying a mapping between the at least one transmitter to at least one RF beam of the plurality of RF beams. In some embodiments, the signal routing actuator is configured to dynamically route the RF signal at least in part by converting the RF signal into an optical signal, transmitting the optical signal over an optical fiber, and recovering the RF signal from the optical signal. In some embodiments, the signal routing controller is configured to receive motion information indicative of a motion of the plurality of antennas and identify the mapping using the motion information. In some embodiments, the wireless communication station further comprises a motion analytics unit configured to receive an output of at least one motion sensor and generate the motion information using the output of the at least one motion sensor. In some embodiments, the signal routing controller is configured to receive network information indicative of a number of subscribers in at least one of the plurality of sectors and identify the mappings using the network information.

In some embodiments, the signal routing system comprises a transport system configured to receive a plurality of RF signals comprising the RF signal from each of the plurality of RF transmitters, add an address to each of the plurality of RF signals indicative of one or more antennas of the plurality of antennas that are assigned to transmit the respective RF signal, and provide the plurality of RF signals to at least some of the plurality of antennas using the address associated with each of the plurality of RF signals. In some embodiments, the transport system is a dense optical transport system (DOTS) comprising a DOTS head end configured to receive the plurality of RF signals and generate an optical signal from the plurality of RF signals and the address associated with each of the plurality of RF signals and a plurality of DOTS decoders each configured to receive the optical signal, recover an RF signal from the optical signal based on the address associated with one or more of the plurality of RF signals, and provide the recovered RF signal to an antenna from the plurality of antennas.

In some embodiments, a first subset of the plurality of antennas have a first gain value and a second subset of the plurality of antennas have a second gain value that is higher than the first gain value. In some embodiments, the wireless communication station further comprises a structure having a height of at least 100 meters and wherein the plurality of antennas are mounted on the structure at a height of at least 100 meters above ground. In some embodiments, the structure includes an aerostat including an envelope constructed to hold a lighter than air gas and a mooring station coupled to the aerostat by at least one tether and including at least one winch to adjust a height of the aerostat above the ground.

According to at least one aspect, a wireless communication system is provided. The wireless communication system comprises a plurality of antennas that are co-located and configured to provide coverage for one or more subscribers within a coverage area, a plurality of transmitters each being configured to communicate with an external system and generate an RF signal, and a signal routing system coupled between the plurality of transmitters and the plurality of antennas, the signal routing system being configured to dynamically assign the plurality of transmitters to the plurality of antennas and comprising a transport system configured to receive a plurality of RF signals comprising the RF signal from each of the plurality of RF transmitters, add an address to each of the plurality of RF signals indicative of one or more antennas of the plurality of antennas that are assigned to transmit the respective RF signal, and provide the plurality of RF signals to at least some of the plurality of antennas based on the address associated with one or more of the plurality of RF signals.

In some embodiments, the transport system is a dense optical transport system (DOTS) comprising a DOTS head end configured to receive the plurality of RF signals and generate an optical signal from the plurality of RF signals and the address associated with each of the plurality of RF signals and a plurality of DOTS decoders each configured to receive the optical signal, recover an RF signal from the optical signal based the address associated with one or more of the plurality of RF signals, and provide the recovered RF signal to an antenna from the plurality of antennas.

According to at least one aspect, a large area wireless communication station is provided. The wireless communication station provides mobile communication signals at distances up to 50 km from the location of the station. The wireless communication station includes a plurality of antennas that are co-located and configured to each provide coverage to a portion of a coverage area and in sum to provide coverage to the entirety of the coverage area. The plurality of antennas includes at least two antennas with different gains, such as a high-gain antenna and a low-gain antenna. The wireless communication station further includes a plurality of transmitters communicatively coupled to the plurality of antennas and configured to communicate with an external system and a signal routing system configured to dynamically direct a radio frequency (RF) signal from any one or more of the plurality of transmitters to any one or more of the plurality of antenna. The signal routing system is configured such that each of the plurality of transmitters may alternately be coupled to one or more of one, several or all of the plurality of antennas and such that each of the plurality of antennas may alternately be coupled to one or more of one, several or all of the plurality of transmitters.

In some embodiments, the signal routing system includes a plurality of RF switches and the signal routing system is further configured to dynamically direct the RF signal at least in part by controlling a state of at least one RF switch of the plurality of RF switches. In these embodiments, the signal routing system may further include a controller coupled to the plurality of RF switches and configured to control the state of the at least one RF switch.

According to at least one aspect, a wireless communication system is provided. The wireless communication system includes a plurality of transmitters each configured to receive information from an external system and generate a first radio frequency (RF) signal based on the received information, a plurality of antennas communicatively coupled to the plurality of transmitters, and a signal routing system coupled between the plurality of transmitters and the plurality of antennas, the signal routing system being configured to receive the first RF signal from each of the plurality of transmitters and dynamically provide a second RF signal to at least a portion of the plurality of antennas.

In some embodiments, at least one of the plurality of transmitters includes a baseband unit (BBU) configured to receive information from the external system and generate a baseband signal based on the received information and a remote radio head (RRH) coupled to the BBU and configured to receive the baseband signal from the BBU and generate the first RF signal based on the baseband signal.

According to at least one aspect, a wireless communication station is provided. The wireless communication station includes a structure having a height of at least 100 meters, a plurality of antennas mounted on the structure at a height of at least 100 meters above ground, a emote station mounted on the structure and communicatively coupled to the plurality of antennas, the remote station configured to receive a first optical signal and dynamically provide a radio frequency (RF) signal to at least a portion of the plurality of antennas based on the first optical signal, and a base station communicatively coupled to the remote station by an optical fiber, the base station being configured to receive information from an external system, generate the first optical signal based on the received information, and transmit the first optical signal to the remote station over the optical fiber.

In some embodiments, the base station is configured to receive a second optical signal from the remote station and provide information to the external system based on the received second optical signal. In some embodiments, the remote station is communicatively coupled to the plurality of antennas by a plurality of coaxial cables. In some embodiments, the structure includes a tower.

In some embodiments, the structure includes an aerostat including an envelope constructed to hold a lighter than air gas and a mooring station coupled to the aerostat by at least one tether and including at least one winch to adjust a height of the aerostat above the ground. In these embodiments, the base station may be configured to receive a control signal to control operation of the aerostat and the base station may include a multiplexer to add the control signal to the first optical signal to form a second optical signal and transmit the second optical signal to the remote station via the optical fiber.

Features of the above-described embodiments may be used alone or in any suitable combination.

The foregoing summary is provided by way of illustration and is not intended to be limiting.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 14 shows another example coverage area, according to some embodiments;

DETAILED DESCRIPTION

Figure 1A:
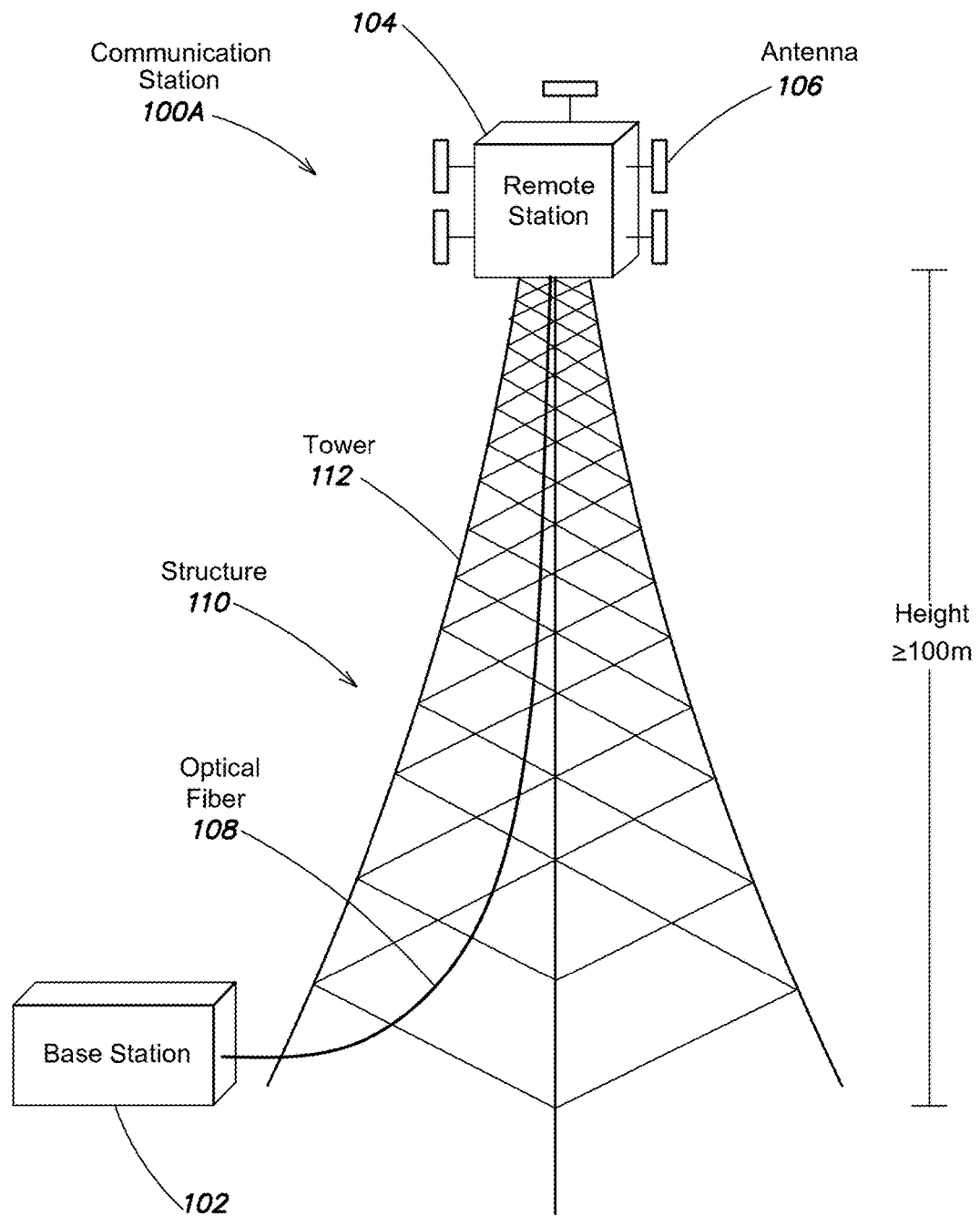
FIG. 1A shows an example communication station, according to some embodiments.

Aspects of the present application are directed to a wireless communication station that is capable of providing telecommunication services to users over a large area, such as over a 100 kilometer radius from the station. Conventionally, cell phone towers have a range of approximately 6 to 10 kilometers to reduce the number of users that are connected to the tower at any given time. Further, cell phone towers generally subdivide the coverage area into three separate sectors and associate a set of telecommunication equipment with each of the individual sectors. Each sector may be serviced by a directional antenna with a beam width of 120 degrees that is communicatively coupled to one of the sets of telecommunication equipment. Thereby, each set of telecommunication equipment only handles the users within a single sector to increase the total capacity of the cell tower. Accordingly, a user making a call from a given sector would be serviced by the set of telecommunication equipment associated with the sector. Cell tower designers typically deploy shorter cell phone towers with smaller ranges in greater numbers to provide coverage to areas with a high density of users to reduce the number of users that are within range of any given cell tower.

The inventors have appreciated that the number of users in each sector is generally uneven and that the telecommunication equipment may be used more efficiently by dynamically shifting channel resources provided by the telecommunication equipment to the sectors, and users in need of those resources, or by dynamically adjusting the shape and/or size of sectors, to accommodate changes in demand. Thereby, the same amount of telecommunication equipment (and thus capacity) can provide service to a greater number of users under normal conditions where the distribution of users is uneven across the coverage area. Further, the inventors have appreciated that the dynamic allocation of telecommunication equipment allows the cell tower to cover a larger range, such as up to 100 kilometers, with less telecommunication equipment than would otherwise be required. Thereby, networks of short towers that are tightly packed can be replaced with a smaller number of taller towers that have greater range. Accordingly, the cost of building a telecommunication network capable of providing service to users over a given geographic area is reduced.

In some embodiments, a wireless communication station is provided that is capable of providing telecommunication services to users over a large area, such as 1,000-10,000 square kilometers. In these embodiments, the large coverage area may be subdivided into a plurality of sectors that is each serviced by one or more antennas. These sectors may be any of a variety of shapes. For example, these sectors may be concentric circles. The telecommunication equipment's channel resources may be dynamically allocated between these sectors based on the demand. For example, a first sector may have 15 users while a second sector may have 1,000 users. In this example, the second sector may be allocated more channel resources and/or additional bandwidth (and thus more capacity) than the first sector.

The wireless communication station may include a structure that is at least 100 meters high to place the antennas at a height that is sufficiently high to provide a large line-of-sight coverage area. In some embodiments, the structure may be a tower with a plurality of antennas mounted near the top of the tower. In other embodiments, the structure may be an aerostat that is tethered to a mooring station on the ground. In these embodiments, the antennas may be attached or otherwise connected to the aerostat. For example, the antennas may be mounted inside an envelope of the aerostat and/or on an exterior surface of the envelope, or within a radome on the exterior of the aerostat envelope.

The telecommunication equipment may be divided between a base station that is placed on the ground and a remote station that is placed on the structure proximate the antennas. The remote station may preferably be constructed to be lightweight, to reduce the weight on the structure and be communicatively coupled to the base station by, for example, optical fiber. The remote station may also receive power from the base station by, for example, one or more conductors.

The wireless communication station may include a signal routing system that routes a variety of signals to the various telecommunication and other equipment that comprise the communication system. In some embodiments, equipment or systems within the communication station communicate with external systems, such as a core network, to generate baseband signals that are digitally converted to radio frequency (RF) signals. The information from these RF signals may be converted to an optical signal and transmitted to the signal routing system via the optical fiber. The signal routing system may, in turn, receive the optical signal and transmit RF signals to at least a portion of the plurality of antennas based on the received optical signal. The optical signal may include instructions indicative of which RF signals should be sent to which antennas. Thereby, the antennas to which RF signals are sent may be dynamically shifted and, thus, shift the assignment of channel resources to particular antennas.

The aspects and embodiments described above, as well as additional aspects and embodiments, are described further below. These aspects and/or embodiments may be used individually, all together, or in any combination of two or more, as the application is not limited in this respect.

Example Communication Stations

FIG. 1A shows an example communication station 100A designed to provide telecommunication services to users over a large area, such as 1,000-10,000 square kilometers. As shown, the communication station 100A includes a base station 102 that communicates with a remote station 104 via an optical fiber 108. Power may be provided to the remote station 104 by, for example, one or more conductors (not illustrated). The remote station 104 is mounted to a structure 110 (shown as a tower 112) and is communicatively coupled to a plurality of antennas 106 that are mounted at least 100 meters above the ground. The base station 102 and remote station 104 may contain a variety of telecommunication equipment or systems depending on the particular embodiment. It is understood that the base station 102 refers to the equipment and systems which are located on and/or proximate the ground. Further, certain systems or equipment may be located within the base station 102 in some embodiments while the same systems or equipment may be located elsewhere, including within the remote station 104, in other embodiments.

The base station 102 and/or the remote station 104 may comprise transmitters (such as transmitters 204 described below) that communicate with external systems to provide communication services to a plurality of users. For example, the transmitters may communicate with a core network that routes telecommunication information between communication stations and/or other access points for the users. The transmitters may comprise telecommunication equipment that is configured to generate a plurality of signals for transmission via the antennas 106 based on the information received from, for example, the core network. These signals may be communicated to the remote station 104 via the optical fiber 108. The remote station 104 may, in turn, transmit the appropriate signal to each of the antennas 106 to provide telecommunication services to users.

It should be appreciated that the telecommunication equipment included in the base station 102 may vary based on the particular implementation. In some embodiments, the base station includes a plurality of transmitters that each communicate with external systems (such as a core network) and generate a radio frequency (RF) signal based on the data communicated between the external system and the base station 102. These signals may be combined (e.g., multiplexed together) and communicated to via the optical fiber 108 to the remote station 104 for routing to the appropriate antennas 106.

As shown in FIG. 1, the base station 102 may be located on the ground proximate the structure 110 and the remote station 104 may be located on the structure 110 proximate the antennas 106. Locating the base station 102 and the remote station 104 in this fashion may provide various advantages. For example, distributing the telecommunication equipment in this fashion may place a majority of the telecommunication equipment on (and/or proximate) the ground in the base station 102. Thereby, the remote station 104 may be light and, thereby, reduce the weight on the structure 110. Accordingly, the structure 110 may be less expensive to construct given the smaller load requirements.

The structure 110 may support the remote station 104 and/or the antennas 106. The structure may be, for example, at least 100 meters above the ground. As shown in FIG. 1A, the structure 110 may be a tower constructed from metal or another suitable material. The antennas 106 may be mounted at a location on the structure 110 that is at least 100 meters above the ground to provide the antennas 106 a large line-of-sight area on the ground. The antennas 106 may be mounted to the tower 112 and/or mounted to the remote station 104 (as shown in FIG. 1A).

It should be appreciated that the structure 110 is not limited to a tower or other rigid structure. For example, the structure 110 may be an aerostat including an envelope configured to hold a lighter-than-air gas that lifts the remote station 104 and antennas 106 above the ground. An example of such an implementation is shown by communication station 100B in FIG. 1B. As shown in communication station 100B, the structure 110 is an aerostat 114 including an envelope 122 to hold a lighter-than-air gas, such as methane, helium, hydrogen, and/or heated air, that is connected to one or more winch systems 120 on a mooring station 118 by one or more tethers 116.

The mooring station 118 may control an altitude of the aerostat 114 above the ground. For example, the mooring station 118 may reel in (or let out) the aerostat 114 via the one or more winches 120. The mooring station 118 may lower the aerostat 114 to the ground periodically for maintenance and/or lower the aerostat 114 to the ground during particular events, such as thunderstorms.

The tether 116 may be a load bearing cable that holds the aerostat 114 at a relatively constant location over the mooring station 118. The tether 116 may be constructed from various composite materials and/or metal. It should be appreciated that the tether 116 may include various non-load bearing elements to facilitate communication and/or power transfer between equipment on the ground and the aerostat 114 (and/or the remote station 104). For example, the tether 116 may be a multi-element composite tether further including load bearing cables, a non-load bearing optical fiber that performs the function of optical fiber 108, and/or non-load bearing power conductors to provide power to the remote station 104.

Figure 1B:
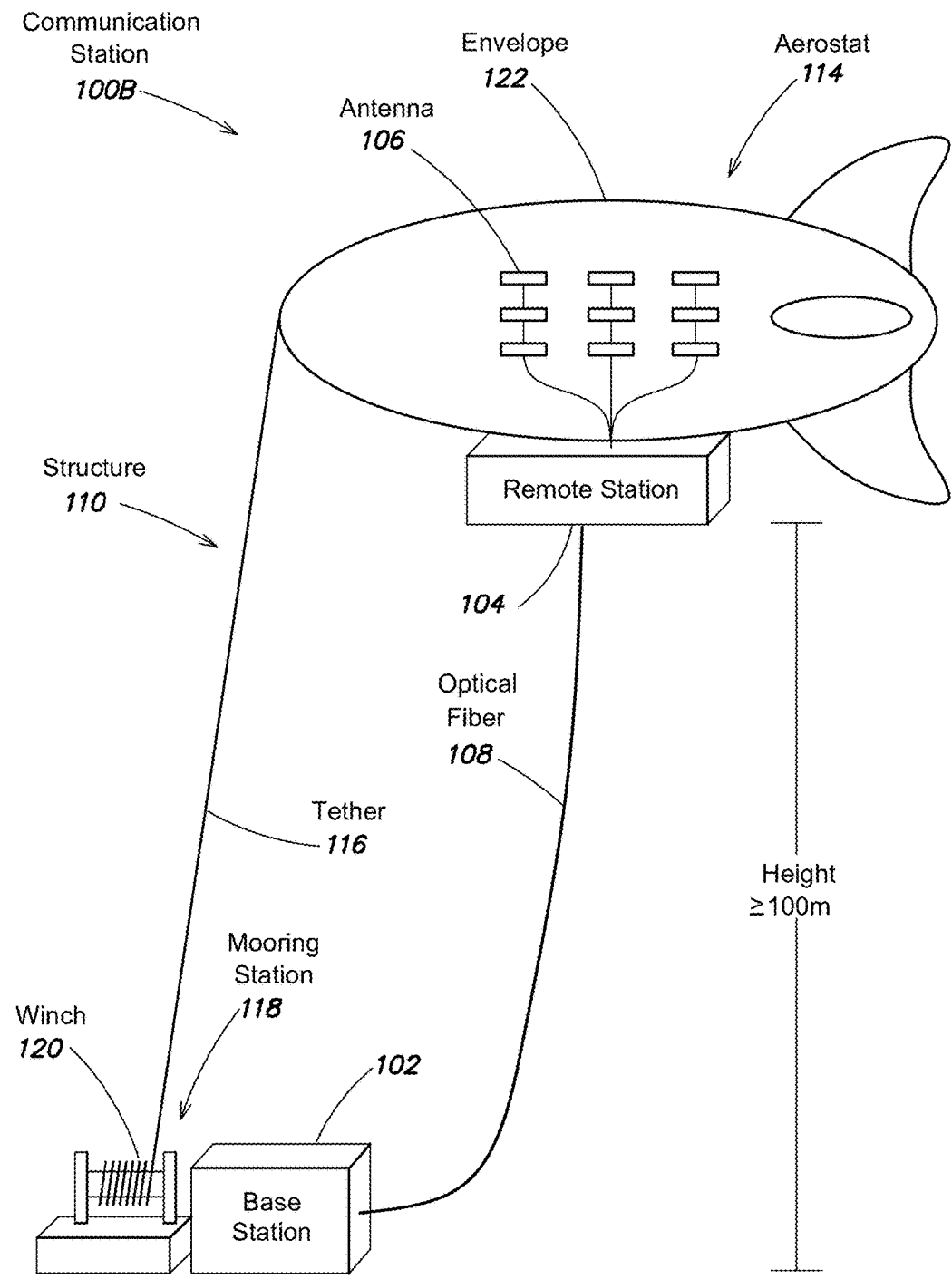
FIG. 1B shows another example communication station, according to some embodiments.

The aerostat 114 may be configured to lift the antennas 106 and the remote station 104 at least 100 meters above the ground. For example, the envelope 122 of the aerostat 114 may include a light-than-air gas that provides lift. The remote station 104 may be mounted to, for example, the envelope 122 of the aerostat 114 by any of a variety of methods. The antennas 106 may be mounted to the remote station 104 and/or mounted to the envelope 122 of the aerostat 114 (as shown in FIG. 1B). It should be appreciated that the antennas 106 may be mounted to the interior of the envelope 122 and/or on the exterior of the envelope 122. Additionally, the envelope 122 may be constructed from an RF transparent material.

In some embodiments, the aerostat 114 may include one or more flight control mechanisms to adjust a heading, pitch, and/or yaw of the aerostat 114. In these embodiments, a signal routing system (e.g., signal routing system 210 described below) may combine the control signals for the flight control mechanisms of the aerostat 114 with the communication signals in an optical signal and transmit the optical signal between the base station 102 and remote station 104 via the optical fiber 108. The signal routing system may, in turn, separate the control signals from the communication signals and provide the control signals to the appropriate flight control mechanisms. It should be appreciated that other signals separate from control signals may be transported by the optical fiber 108 between the base station 102 and the remote station 104. For example, the optical fiber 108 may be used to transport information from various monitoring equipment, such as weather monitoring equipment, in the remote station 104 to the base station 102. As a further example, the optical fiber 108 may be used to transport a wireless backhaul signal from a backhaul transceiver mounted on the aerostat 114 to the base station 102.

In some embodiments, the communication station 100B may utilize natural ground features such as hills or mountains to gain additional height relative to users on the ground. For example, the users may be in a city, such as Los Angeles, Calif., and the mooring station 118 and/or base station 102 may be mounted on a mountain that overlooks the city, such as Mount Lee. Thereby, the antennas 106 may be higher relative to the users on the ground and reach users that are further away from the communication station 100B. It should be appreciated that the communication station 100A or any other communication station may also utilize natural ground features in a similar fashion.

Example Communication Systems

The communication stations discussed herein are capable of providing telecommunication services over a large coverage area to users who may be mobile or whose usage patterns may be variable. A communication station typically has a fixed set of telecommunication resources or equipment. It is thus advantageous that the communication stations utilize communication systems that may dynamically adjust the allocation of telecommunication resources to different regions within the coverage area, allowing the telecommunication resources available to be utilized as efficiently as possible to provide maximally beneficial telecommunication services. It is further advantageous that the communication station may support a significant amount of collocated telecommunication resources or equipment to further maximize the data or other services provided to users within the coverage area. To this end, a communication station, such as communication stations 100A and/or 100B, may utilize a communication system that incorporates a signal routing system that, among other purposes, routes one or more fronthaul signals along one or more preferred paths to the one or more air interfaces (via one or more RF signals output from the signal routing system) in a manner that optimizes the overall performance of the communication station 100.

Figure 2A:
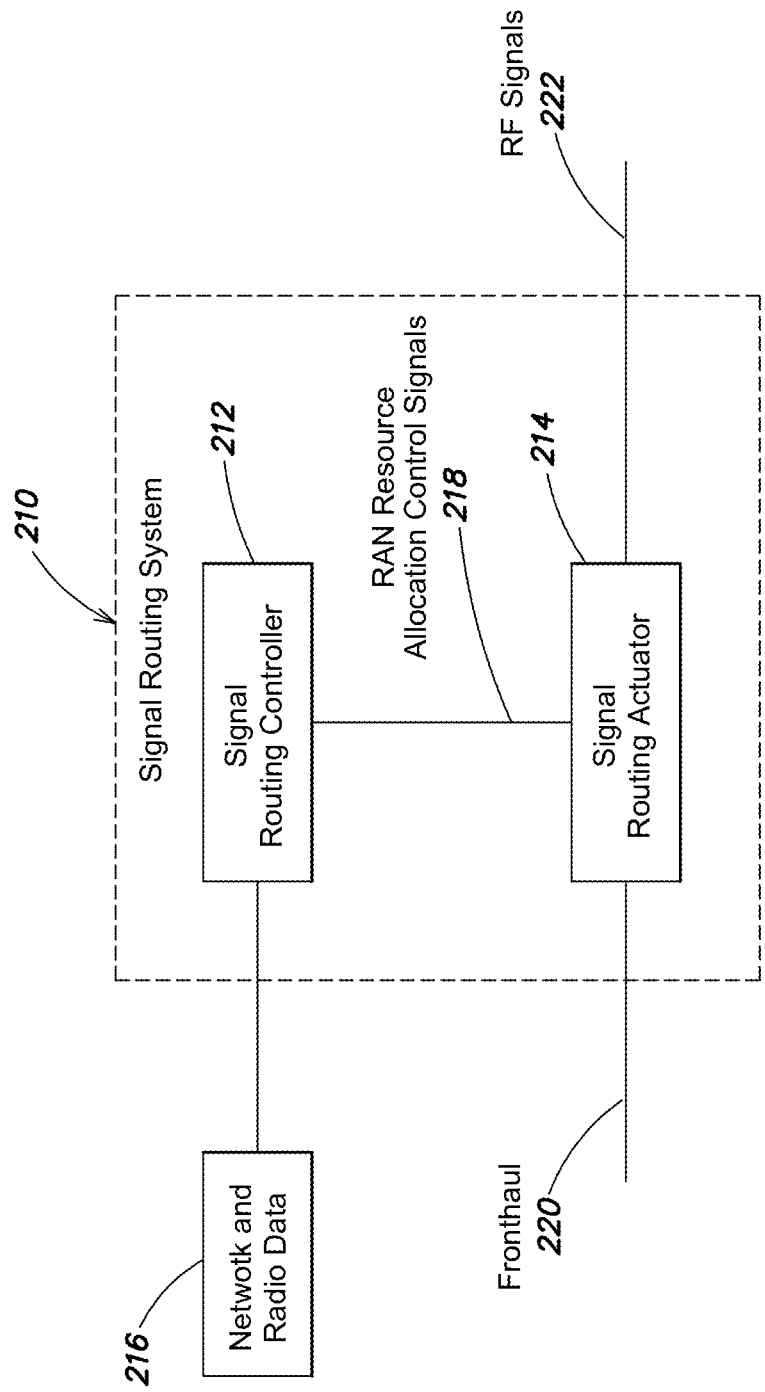
FIG. 2A shows an example implementation of a signal routing system, according to some embodiments.

An example of a signal routing system is shown schematically in FIG. 2A by signal routing system 210. As shown, the signal routing system 210 may comprise a signal routing controller 212, which contains control logic to optimally determine the mapping between fronthaul signals 220 and air interfaces (e.g., a sector within a coverage area, a portion of a sector within a coverage area, one or more antennas that provide wireless coverage, and one or more beams from a multi-beam antenna that provides coverage) at any given point in time, and a signal routing actuator 214, which adjusts the signal routing paths to connect the one or more fronthaul signals 220 to the one or more air interfaces in a manner consistent with the optimal mapping determined by the signal routing controller 212. The signal routing controller 212 may generate and deliver to the signal routing actuator 214 a RAN resource allocation control signal 218 containing instructions for the actuators to achieve the above described optimal routing. The signal routing controller 212 may receive network and radio data 216 from, for example, the transmitter 204 or core network, and use such data to determine the optimal mapping between the fronthaul signals 220 and air interfaces. It should be appreciated that the signal routing controller 212 may provide substantially real time optimization of the mapping, and the signal routing actuator 214 may adjust the routing in substantially real time so as to dynamically optimize the performance of the communication station 100 in substantially real time. Such real time optimization offers a significant advantage, especially in scenarios where users within the communication station coverage area are mobile or the usage patterns are highly variable in time.

The signal routing system 210 may adjust the signal routing paths in any of a variety of ways. For example, the signal routing system 210 may be coupled to a plurality of antennas and direct an RF signal 222 to specific antennas within the plurality of antennas. Thereby, fronthaul signals 220 may be dynamically counted to different antennas that provide coverage for different sectors. Additionally (or alternatively), one or more of the plurality of antennas may be a multi-beam antenna configured to generate a plurality of beams. In these implementations, the signal routing system 210 may route fronthaul signals 220 to particular beams generated by the multi-beam antenna.

Figure 2B:
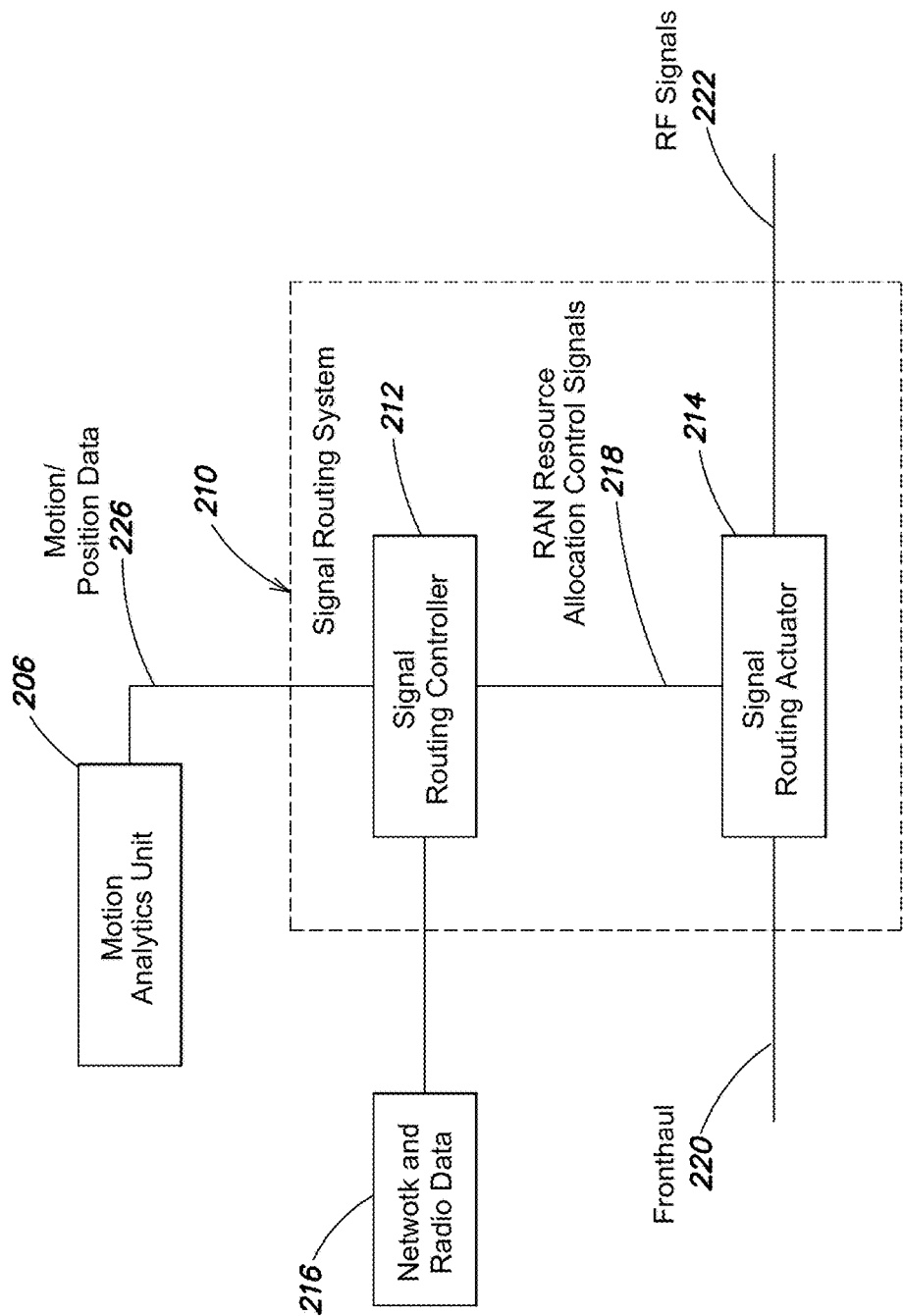
FIG. 2B shows another example implementation of a signal routing system, according to some embodiments.

The communication station 100 may further incorporate a motion analytics unit 206 that provides motion and/or position related data 226 to the signal routing controller 212 of the signal routing system 210, as depicted in FIG. 2B. The motion and/or position related data 226 may include, but is not limited to, the position and orientation of the structure or antennas, predicted motion of the structure or antennas or motion related commands to the signal routing system. The signal routing controller 212 may use such motion and/or position related data 226, either separately or in concert with the network and radio data 216, to determine the optimal mapping between the fronthaul signals 220 and air interfaces.

Figure 3:
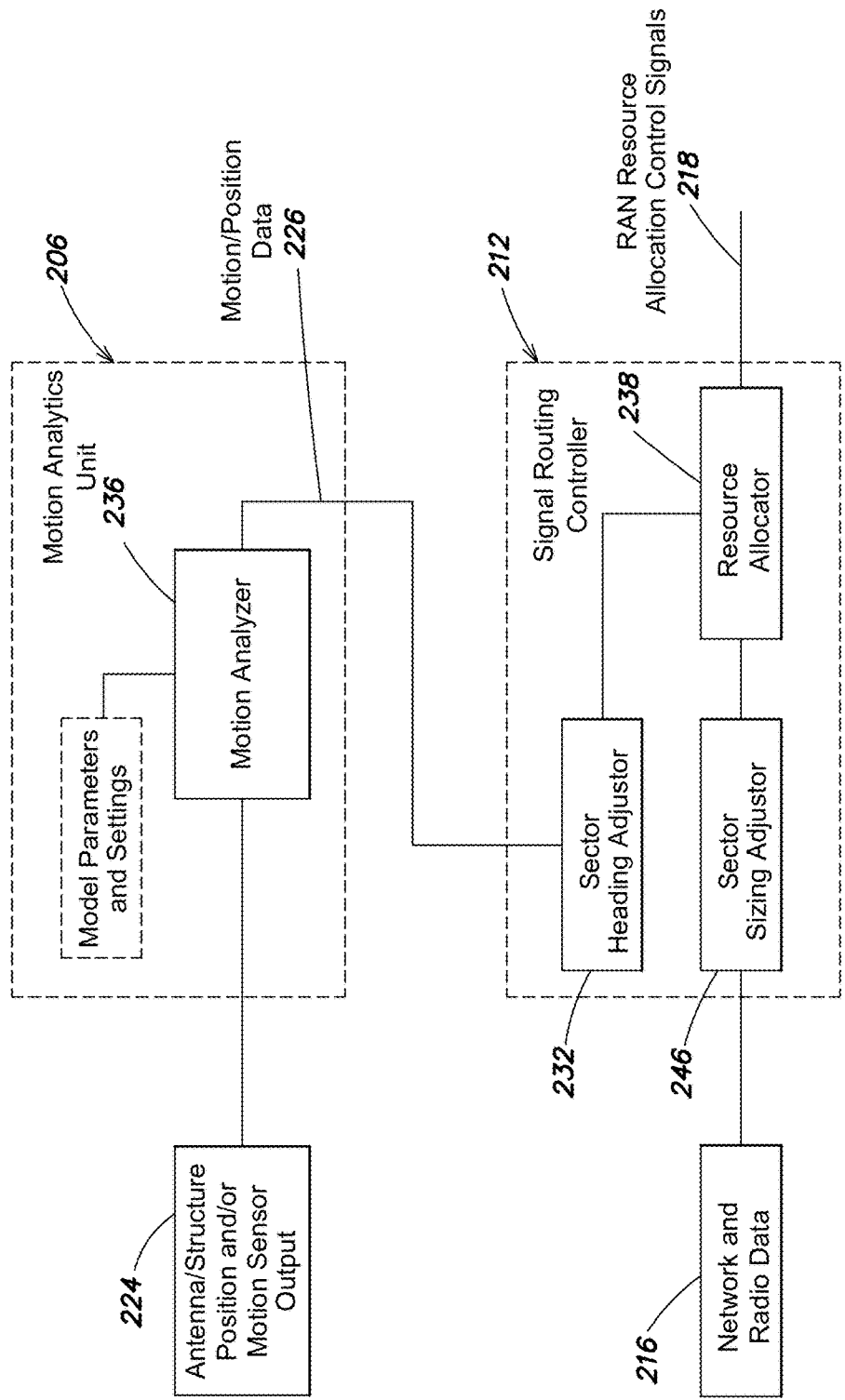
FIG. 3 shows an example implementation of a motion analytics unit and signal routing controller, according to some embodiments.

A schematic embodiment of the motion analytics unit 206 and signal routing controller 212 is shown in FIG. 3. The motion analytics unit 206 may receive external measurements of the position and/or motion of the antenna(s) and/or structure 224. A motion analyzer module 236 may process the external position and/or motion measurements and incorporate an internal model of the structure and/or antennas, utilizing model parameters and settings as necessary. For example, a wireless coverage prediction model may be employed to determine the impact of the antenna motion on the wireless coverage provided to one or more subscribers.

The motion analyzer module 236 may subsequently output the motion and/or position related data 226, as required by the particular application or embodiment of the receiving signal routing controller 212.

The signal routing controller 212 may comprise a sector heading adjustor module 232 which determines the preferred physical orientation of the one or more air interface sectors or beams at any given point in time, at least in part based on the motion and/or position related data 226 from the motion analytics unit 206. The signal routing controller 212 may further comprise a sector sizing adjustor module 246 which determines the preferred sizing and/or shape of the one or more air interface sectors, subject to constraints relating to the available degree and mechanism of actuation, at any given point in time, at least in part based on the network and radio data 216. A resource allocator 238 may contain logic to intelligently combine the inputs from the sector heading adjustor module 232 and the sector sizing adjustor module 246 to determine the optimal mapping between fronthaul signals and air interfaces based on any number of strategies or algorithms, and may produce and output the appropriate RAN resource allocation control signal 218 to achieve the optimal mapping.

In some embodiments, one or more transmitters may be employed to generate RF signals (e.g., RF signal 222). The transmitters may be, for example, Radio Access Network (RAN) transmitters that connect to an external network, such as an Evolved Packet Core or other controlling network, via a protocol (e.g., TCP/IP, CPRI, and OBSAI) and generate RF signals based on data received from the external network. As shown in FIG. 4B, a transmitter 204 may be implemented as a single device with multiple components each configured to perform various functions. For example, the transmitter 204 in FIG. 4B comprises an internet protocol (IP) conversion component 306 to communicate with the network 202 using internet protocols, such as IPv4 and IPv6, and convert the communicated data to baseband signals, a baseband processing component 308 to process the received baseband signals, and an RF processing component 310 to upconvert the received baseband signals to generate RF signals.

Figure 4A:
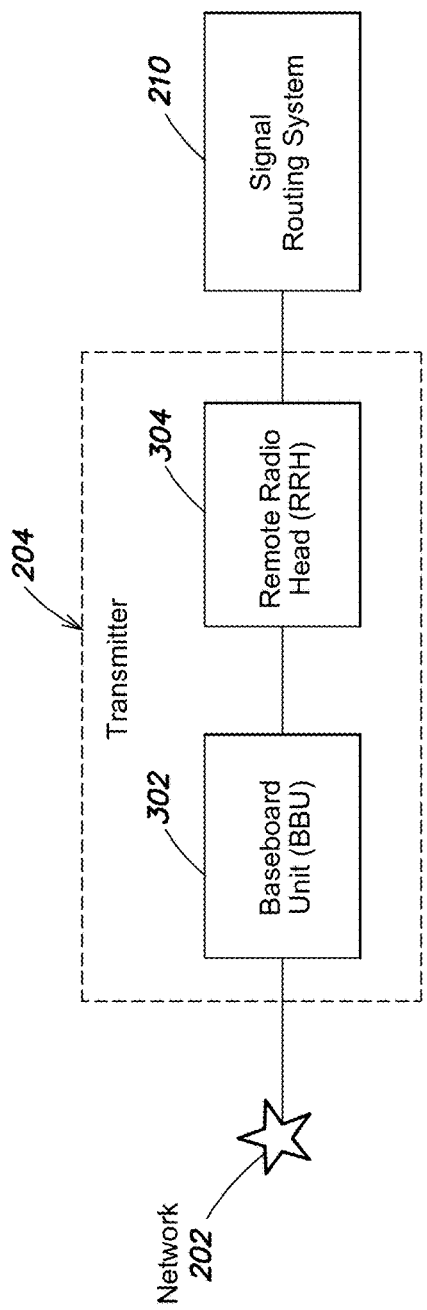
FIG. 4A shows an example implementation of a transmitter that may be employed in the communication system of FIGS. 2A and/or 2B, according to some embodiments.
Figure 4B:
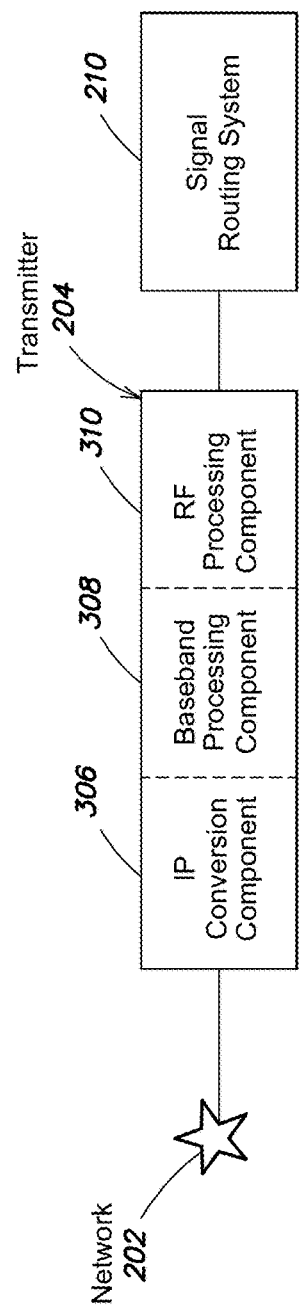
FIG. 4B shows another example implementation of a transmitter that may be employed in the communication system of FIGS. 2A and/or 2B, according to some embodiments.

Alternatively as shown in FIG. 4A, a transmitter 204 may be implemented as multiple devices such as a Baseband Unit (BBU) 302 and one or more Remote Radio Heads (RRH) 304. Example transmitters include Node Bs or eNodeBs, Optical to RF converters, Ethernet to RF converters, or similar devices. The transmitters 204 may be implemented in any of a variety of ways depending upon, for example, the particular service being provided to subscribers on the ground. Example services that may be provided to subscribers on the ground include 3G, 4G, 5G, or other data or voice services. The particular number of transmitters 204 employed in the communication system 200 may vary based on, for example, the expected number of subscribers to connect to communication system 200.

It should be appreciated that the transmitters 204, in some embodiments, may be constructed as transceivers that are configured to both process received signals and generate RF signals. For example, the transceivers may be configured to receive RF signals from the signal routing system 210, process the received RF signals to convert the RF signals to baseband signals, and provide the baseband signals (and/or data indicative of the baseband signals) to the network 202 via traditional LTE backhaul or other intermediate network links. Further, the transmitters 204 or portions thereof may be located outside the communication station 100. For example, the transmitters 204 or portions thereof may be located off-site with the network 202 or may be virtualized and located in the cloud, such as with C-RAN.

Figure 5:
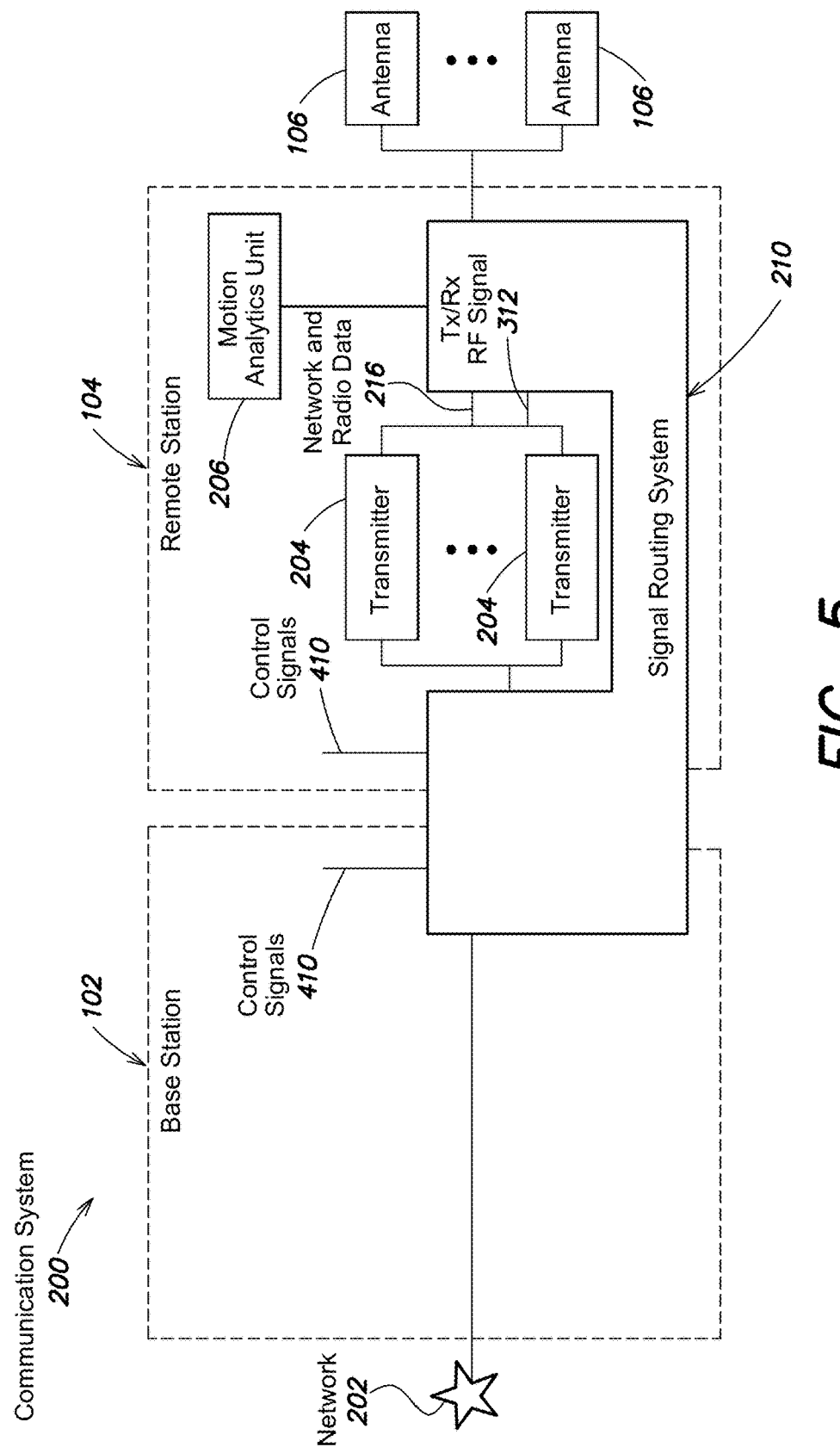
FIG. 5 shows an example communication system that may be deployed in the communication stations of FIGS. 1A and/or 1B, according to some embodiments.

An example communication system that may be employed on any of the structures described here (e.g., the structures shown in FIGS. 1A and 1B) is shown in FIG. 5 by communication system 200. As shown, transmitters 204 are located within the remote station 104 and are communicatively coupled with an external network 202 via the signal routing system 210, which spans the remote station 104 and base station 102. The one or more transmitters 204 generate one or more Tx/Rx RF signals 312 which are routed via the signal routing system 210 to the one or more antennas 106. The signal routing system 210 may optionally route control signals 410, such as, for example, aerostat control signals, between the base station 102 and the remote station 104.

In some embodiments, the signal routing system 210 may incorporate multiplexers (shown as mux 406 and mux 408) to multiplex the control signals 410 with signals from the network 202 and/or transmitters 204 for transmission over an optical fiber cable that communicatively couples the base station 102 to the remote station 104. For example, the mux 406 may combine an optical signal from the network 202 and optical control signals 410 into a single optical signal that is transmitted over an optical fiber from the base station 102 to the mux 408 in the remote station 104. The mux 408 may separate the control signal 410 from the network optical signal and transmit the network optical signal to the one or more transmitters 204. In another embodiment, the communication system 200 may omit the multiplexers 406 and/or 408 and transmit the optical signal directly from the network 202 to the one or more transmitters 204.

In some embodiments, the communication system 200 may comprise motion analytics unit 206 which provides motion and/or position related data to the signal routing system 210 for the purpose of optimizing the performance of the communication system 200. The signal routing system 210 may, for example, utilize such motion and/or position related data to dynamically route the Tx/Rx RF signal 312 from the one or more transmitters 204 to one or more antennas 106 so as to minimize the number of handovers experienced by users within the coverage area of the communication station 100 as a result of the motion of the antennas 106.

The embodiment depicted in FIG. 5 may further include a mechanism for transmitting network and radio data 216 from the transmitter 204 to the signal routing system 210 for the purpose of optimizing the performance of the communication system 200. The network and radio data 216 may include, but is not limited to, a number of subscribers in at least one sector of the plurality of sectors, a number of transmitters assigned to the at least one sector, a total number of subscribers on the wireless network, an average data throughput, a sector handover rate, a rate at which subscribers are being added to the wireless network, a rate at which subscribers are leaving the wireless network, a modulation scheme employed by the wireless network, a performance of at least one component of the wireless communication system (e.g., physical layer performance), and a resource block allocation. The signal routing system 210 may, for example, use the network and radio data 216 to dynamically route the Tx/Rx RF signal 312 from the one or more transmitters 204 to the one or more antennas 106 in a manner that substantially evenly distributes the number of active users or the data throughput across all of the one or more transmitters 204 so that the overall number of active users or data throughput or Quality of Service of the communication station 100 is maximized.

In a further modification of the embodiment depicted in FIG. 5, the signal routing system 210 dynamically adjusts various parameters on the one or more transmitters 204 based on the motion related data from the motion analytics unit 206. For example, the signal routing system 210 may adjust the time-to-trigger, handover hysteresis, and/or transmitter parameters (such as TDD UL-DL Configuration), to dynamically optimize system performance.

Figure 6:
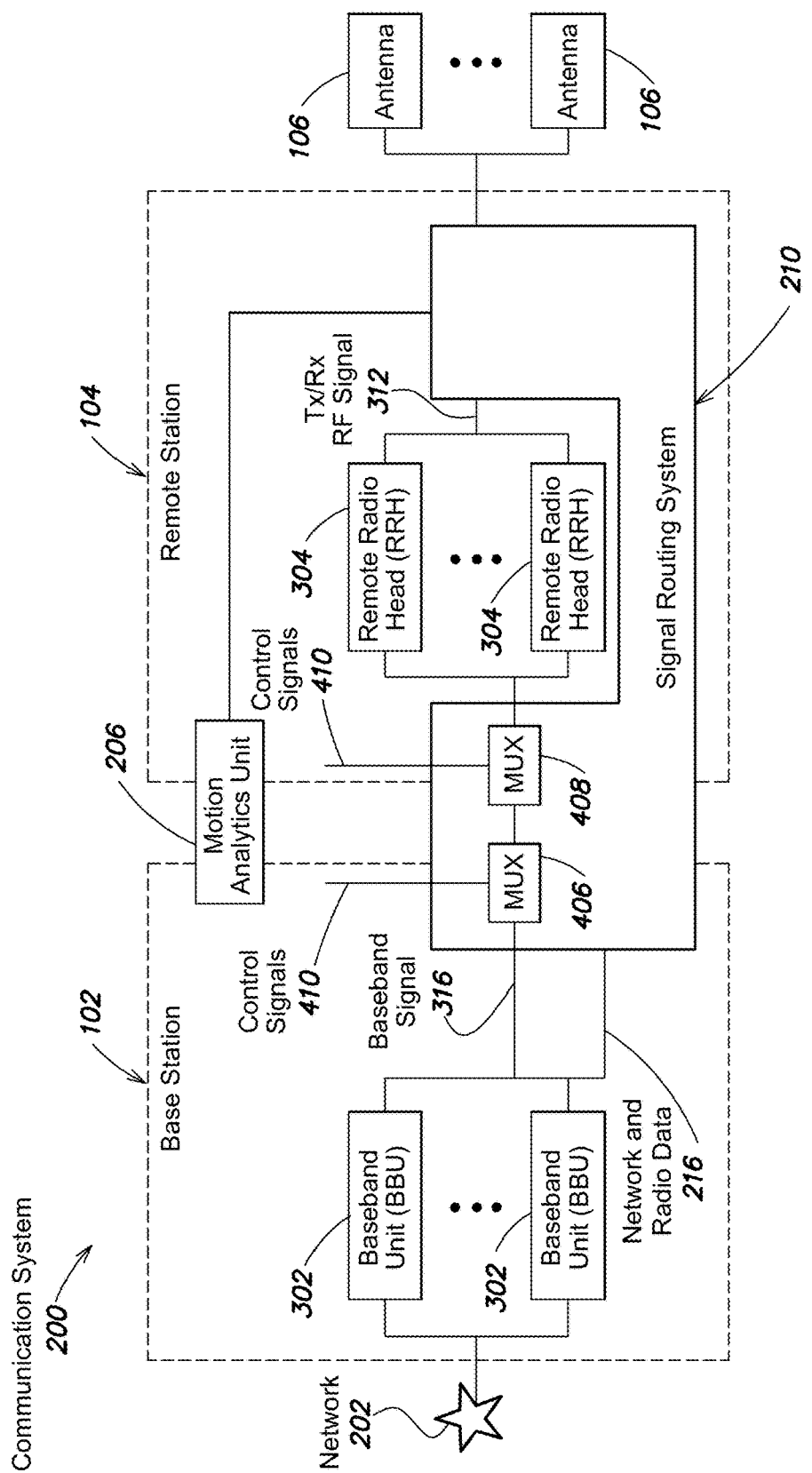
FIG. 6 shows another example communication system that may be deployed in the communication stations of FIGS. 1A and/or 1B, according to some embodiments.

In the embodiment depicted in FIG. 6 one or more BBUs 302 are located within the base station 102. The BBUs 302 are configured to receive information from the external network 202 and generate a baseband signal 316. The one or more baseband signals 316, taking the form of an optical signal, may be transmitted to a mux 406 within the signal routing system 210. The one or more optical baseband signals 316 may be combined by the multiplexer 406 with control signals 410 or other optical signals and transmitted via the signal routing system 210 to a multiplexer 408 located within the remote station 104. The multiplexer 408 may separate the one or more baseband signals 302 and the control signals 410 or other optical signals and may transmit the one or more baseband signals 302 to the one or more RRHs 304 located within the remote station 104. The one or more RRHs 304 may generate one or more Tx/Rx RF signals 312 which are routed by way of the signal routing system 210 to one or more antennas 106. In a manner similar to that of the embodiment depicted in FIG. 5, the motion analytics unit 206 may provide motion and/or position related data to the signal routing system 210, and the one or more BBUs 302 may provide network and radio data 216 to the signal routing system 210. The signal routing system 210 may utilize the motion and/or position data to dynamically adjust the settings of the one or more BBUs 302 or otherwise optimize the performance of the communication system 200.

Figure 7A:
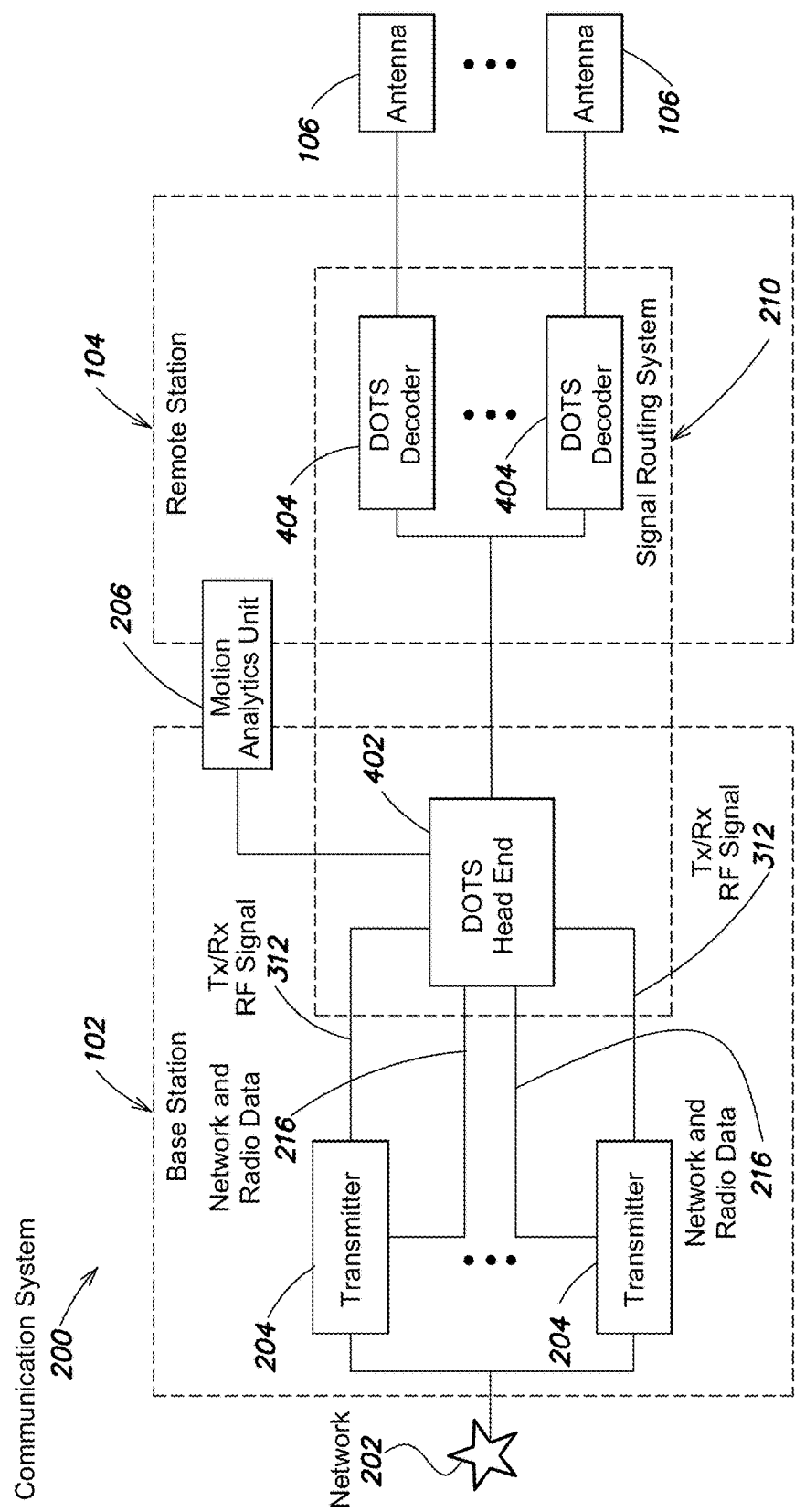
FIG. 7A shows another example communication system that may be deployed in the communication stations of FIGS. 1A and/or 1B, according to some embodiments.
Figure 7B:
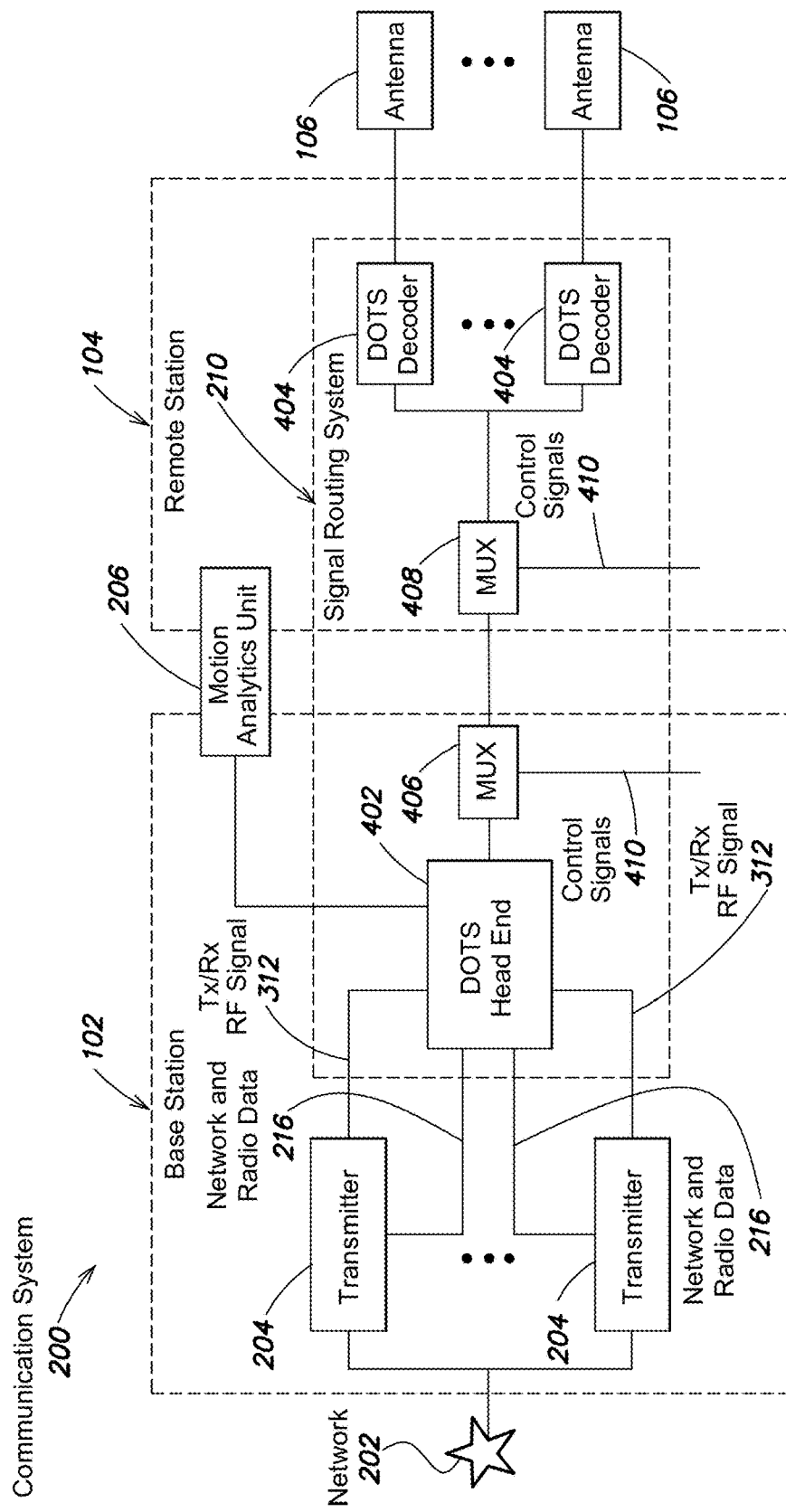
FIG. 7B shows another example communication system that may be deployed in the communication stations of FIGS. 1A and/or 1B, according to some embodiments.

In a further embodiment, depicted in FIG. 7A, the signal routing system 210 using an optical transport system such as a Dense Optical Transport System (DOTS). The DOTS comprises a DOTS Head End 402 located within the base station 102 and communicatively coupled to one or more DOTS Decoders 404 located within the remote station 104. The DOTS head end 402 is configured to generate a digital optical signal which is transmitted to the one or more DOTS Decoders 404. A modification of the present embodiment incorporates a multiplexers 406 and 408 within the signal routing system 210 as shown in FIG. 7B, which combines the optical signal generated by the head end with a control signal 410 or other optical signal to transmit all of the aforementioned signals between the base station 102 and the remote station 104 by way of a single optical fiber, which may have certain advantages over having multiple optical fibers between the base station 102 and the remote station 104.

The base station 102 of the present embodiment further incorporates one or more transmitters 204 which generate one or more Tx RF signals which are transmitted to the DOTS Head End 402. The DOTS Head End 402 digitizes each of the incoming Tx RF signals and appends the digital signal with a unique address corresponding to one or more of the one or more DOTS Decoders 404 within the remote station 104. The DOTS Head End 402 may then combine each of the address appended digital signals corresponding to each of the Tx RF signals generated by the one or more transmitters 204 into a composite digital optical signal which is transmitted to each of the one or more DOTS Decoders 404.

The one or more DOTS Decoders 404 may receive the composite digital optical signal and extract that portion of the signal which has been appended with its unique address code or codes. The one or more DOTS Decoders 404 may then decode the extracted portion of the digital signal to reproduce the original Tx RF signal from the corresponding transmitter 204 or the superposed Tx RF signal from the multiple corresponding transmitters 204. The DOTS Decoder 404 may then amplify the Tx RF signal using an amplifier, such as a linear amplifier, and transmit the Tx RF signal to a corresponding antenna 106. It should be appreciated that the Tx RF signal from any one given transmitter 204 may be assigned by the DOTS Head End 402 to one or more DOTS Decoders 404 and thus be simultaneously transmitted (simulcast) by multiple antennas 106. It should be further appreciated that the Tx RF signal from multiple transmitters 204 may be assigned by the DOTS Head End 402 to the same one or multiple or overlapping sets of DOTS Decoders 404, having the effect that the aforementioned DOTS Decoders 404 will transmit the superposed Tx RF signals from the multiple transmitters 204 to the multiple antennas 106 to which the DOTS Decoders 404 are communicatively coupled. In this manner, any combination of Tx RF signals may be assigned to any combination of DOTS Decoders 404 and corresponding antennas 106. Critically, the DOTS Head End 402 may dynamically adjust the assignment of DOTS Decoders 404 so as to dynamically alter the mapping between transmitters 204 and antennas 202.

It should be understood that the DOTS provides a means of bi-directional communication between the one or more transmitters 204 and the one or more antennas 106. The Rx RF signal received by the one or more antennas 106 may be digitized by the DOTS Decoder 404 and appended with the unique address of the given DOTS Decoder 404. The digital signal is then transmitted to the DOTS Head End 402 which reproduces the Rx RF signal and transmits it to the one or more transmitters 204 which are, at any given time, mapped to the one or more receiving antennas 106.

It should be further understood that each DOTS Decoder 404 may have a plurality of Tx/Rx RF ports and may be communicatively coupled to a plurality of antennas 106. Each Tx/Rx RF port and corresponding antenna 106 may be assigned a sub-address, to be appended to the digital signal for the purpose of routing through the signal routing system 210.

As shown in FIGS. 7A and 7B, the communication system 200 may comprise a motion analytics unit 206 which provides motion and/or position related data 226 to the DOTS Head End 402 for the purpose of optimizing the mapping between transmitters 204 and antennas 106. The motion and/or position related data 226 may include, but is not limited to, the position and orientation of the structure or antennas, predicted motion of the structure or antennas or motion related commands to the DOTS Head End. The signal routing system 210 may, for example, utilize such motion and/or position related data 226 to dynamically route the Tx/Rx RF signal 312 from the one or more transmitters 204 to one or more DOTS Decoders 404 so as to minimize the number of handovers experienced by users within the coverage area of the communication station 100 as a result of the motion of the antennas 106.

The embodiments depicted in FIGS. 7A and 7B may further include a mechanism for transmitting network and radio data 216 from the one or more transmitters 204 to the DOTS Head End for the purpose of optimizing the mapping between transmitters 204 and antennas 106. The network and radio data 216 may include, but is not limited to, a number of subscribers in at least one sector of the plurality of sectors, a number of transmitters assigned to the at least one sector, a total number of subscribers on the wireless network, an average data throughput, a sector handover rate, a rate at which subscribers are being added to the wireless network, a rate at which subscribers are leaving the wireless network, a modulation scheme employed by the wireless network, a performance of at least one component of the wireless communication system (e.g., physical layer performance), and a resource block allocation. The DOTS Head End 402 may, for example, use the network and radio data 216 to dynamically assign the Tx/Rx RF signal 312 from the one or more transmitters 204 to the one or more DOTS Decoders 404 in a manner that substantially evenly distributes the number of active users or the data throughput across all of the one or more transmitters 204 so that the overall number of active users or data throughput of the communication system 200 is maximized.

In a further modification of the embodiment depicted in FIG. 7A, the DOTS Head End 402 dynamically adjusts various parameters on the one or more transmitters 204 based on the motion related data 226 from the motion analytics unit 206. For example, the DOTS Head End 402 may adjust the time-to-trigger, handover hysteresis, TDD UL-DL Configuration or other transmitter parameters, to dynamically optimize system performance.

The coverage area 500 of the communication station 100 may be subdivided into a plurality of physical sectors 502, each physical sector 502 being served by a single antenna 106. The coverage area 500 may be subdivided into any number of physical sectors 502 and may be subdivided in any number of patterns. In an illustrative embodiment, depicted in FIG. 8A, the coverage area 500 is subdivided into n wedge-shaped physical sectors 502. Each physical sector 502 is matched to a corresponding antenna 106 and DOTS Decoder 404. The base station of the illustrative embodiment (not shown) incorporates p transmitters 204, where p is less than n. The DOTS Head End 402 may generally simulcast each of the transmitters 204 on a plurality of adjacent DOTS Decoders 404, thus creating p logical sectors, each logical sector being made up of multiple adjacent physical sectors 502. The DOTS Head End may dynamically adjust the number of physical sectors 502 in each logical sector, based on the network and radio data 216, to optimize the performance of the communication system. For example, if a first transmitter 204A has more active users or higher total data throughput than a second transmitter 204B, the DOTS Head End 402 may assign fewer DOTS Decoders 404 to the first transmitter 204A and more DOTS Decoders to the second transmitter 204B until all of the transmitters 204 have substantially equivalent numbers of active users or total data throughput.

It is noted that when the antennas 106 are rotated, the physical sectors 502 are rotated within the coverage area 500 in manner corresponding to the rotation of the antennas 106. The DOTS Head End 402 may thus utilize motion and/or position data 226 from the motion analytics unit 206 to dynamically adjust the mapping between the p transmitters 204 and n DOTS Decoders 404 to substantially maintain the stationary position of the logical sectors even in the event of angular rotation of the structure 110 or antennas 106. For example, if a logical sector corresponding to a first transmitter 204A is, at a first point in time, made up of physical sectors 1 and 2 (equivalently, DOTS Decoders 404A and 404B) as depicted in FIG. 8A and the antennas 106 rotate such that at a second point in time the same portion of the coverage area 500 is covered by physical sectors 4 and 5, the DOTS Head End 402 may change the mapping of the first transmitter 204A such that it corresponds to physical sectors 4 and 5 at the second point in time, thus maintaining the logical sector corresponding to a first transmitter 201A in a substantially stationary position with respect to the coverage area 500 so as to minimize handovers experienced by the plurality of users within the coverage area 500.

It should be appreciated that DOTS Head End 402 may simultaneously combine any number of control strategies, such as the strategy to maintain substantially equivalent throughput from each transmitter and the strategy to maintain substantially stationary logical sectors, in order to optimize the overall performance of the communication system 200. It should be further appreciated that a greater number of physical sectors 502 affords a more granular and finer level of control, and for this reason there is a general preference for a large number of physical sectors 502. It should also be appreciated that other strategies of mapping the plurality of transmitters 204 to the plurality of DOTS Decoders 404 may be adopted, such as, but not limited to, simulcasting to non-adjacent DOTS Decoders 404 to increase the effective reuse of the frequency.

Figure 8A:
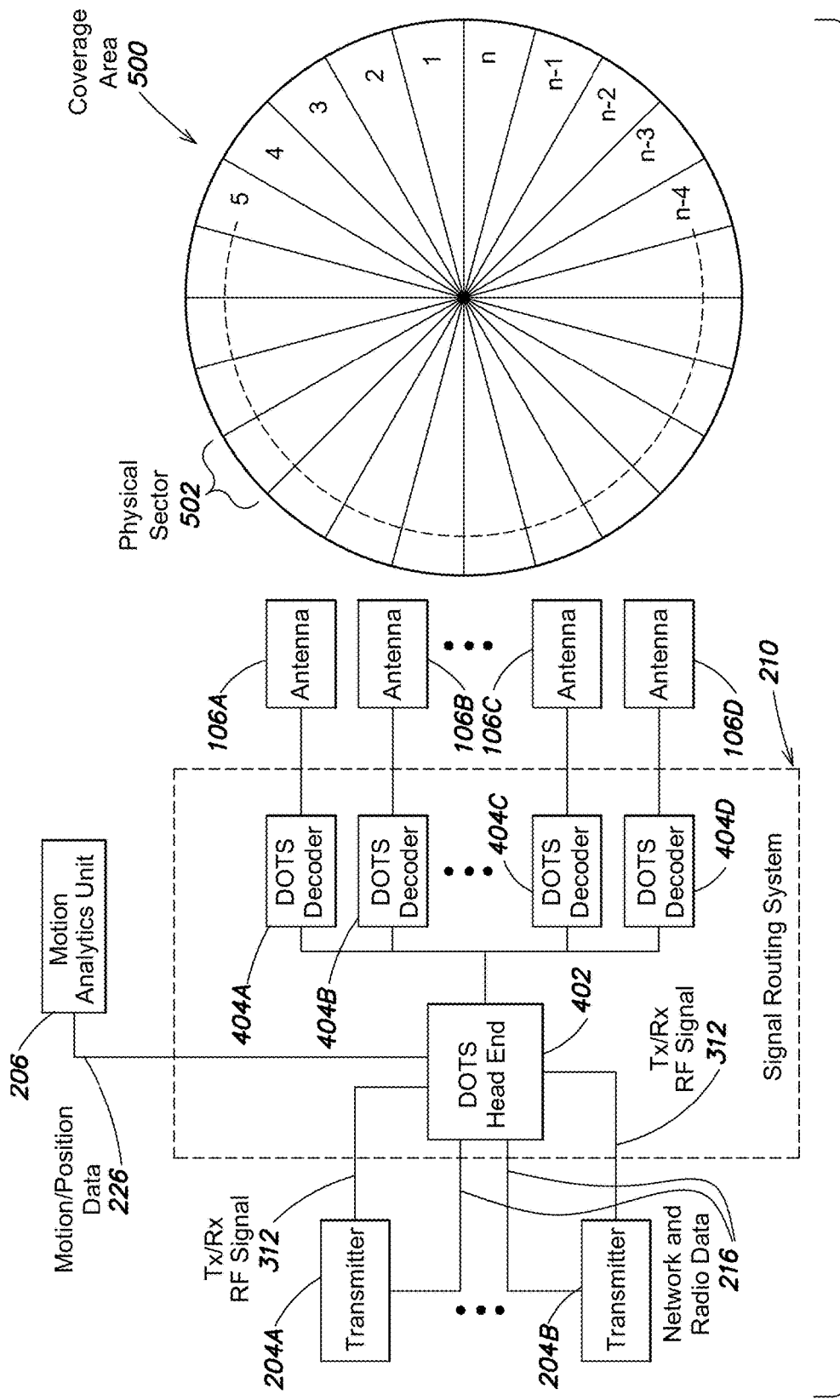
FIG. 8A shows an example implementation of a signal routing system pertaining to an example coverage configuration, according to some embodiments.
Figure 8B:
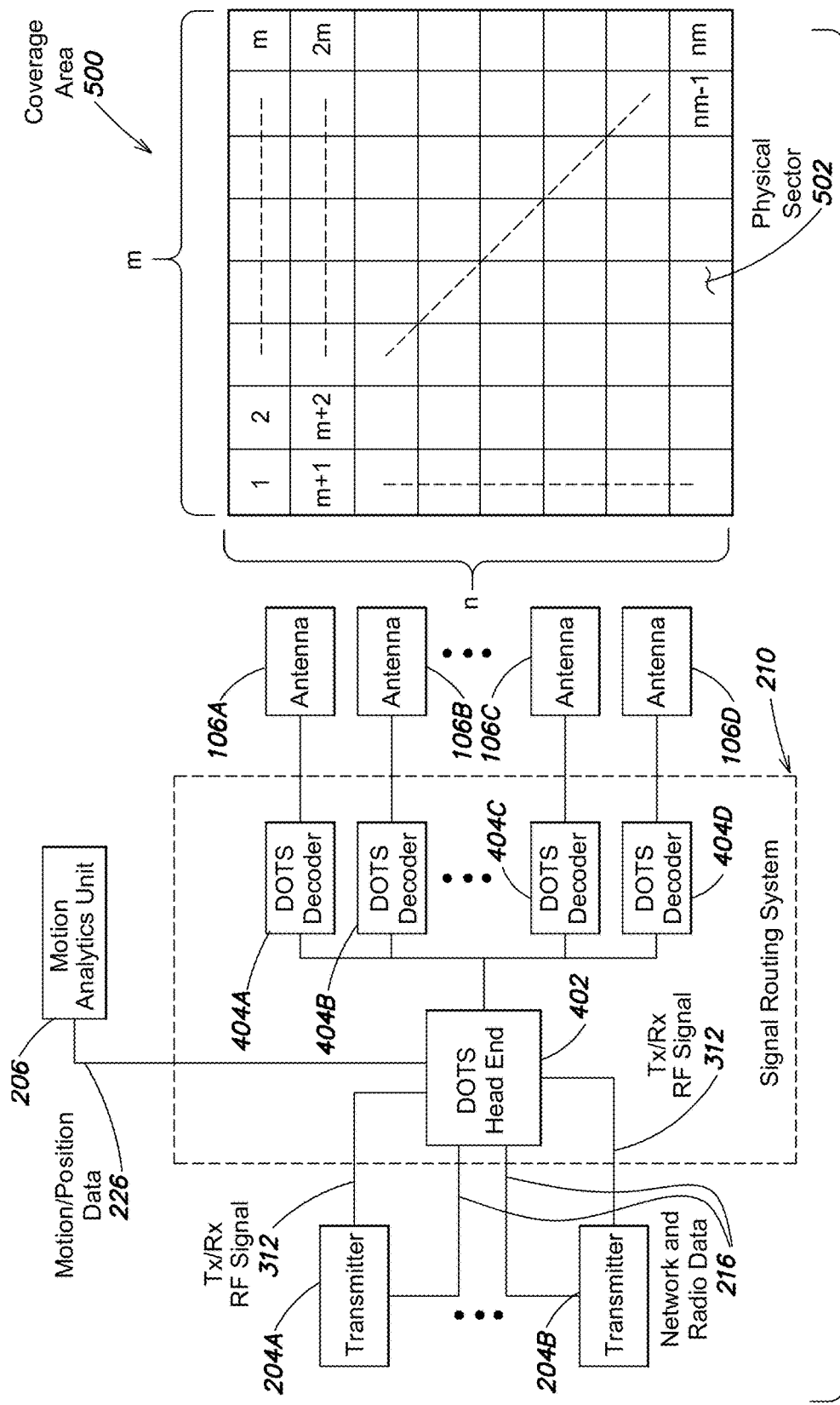
FIG. 8B shows another example implementation of a signal routing system pertaining to an example coverage configuration, according to some embodiments.

The general DOTS Head End 402 mapping control strategies described above may be adapted and utilized for other subdivision patterns besides the wedge-shaped physical sectors depicted in FIG. 8A. For example, FIG. 8B depicts a subdivision pattern made up of an m by n grid of physical sectors 502. The corresponding communication system 200 incorporates p transmitters 204 communicatively coupled to a number of DOTS Decoders 404 equal to mn, the product of m and n. In a manner similar to that described above and utilized by the embodiment depicted in FIG. 8A, the DOTS Head End 402 of the signal routing system 210 depicted in FIG. 8B may dynamically adjust the mapping between the p transmitters 204 and the nm DOTS Decoders 404 so as to maintain substantially equivalent throughput from each transmitter 204 and/or maintain substantially stationary logical sectors within the coverage area 500.

Figure 9:
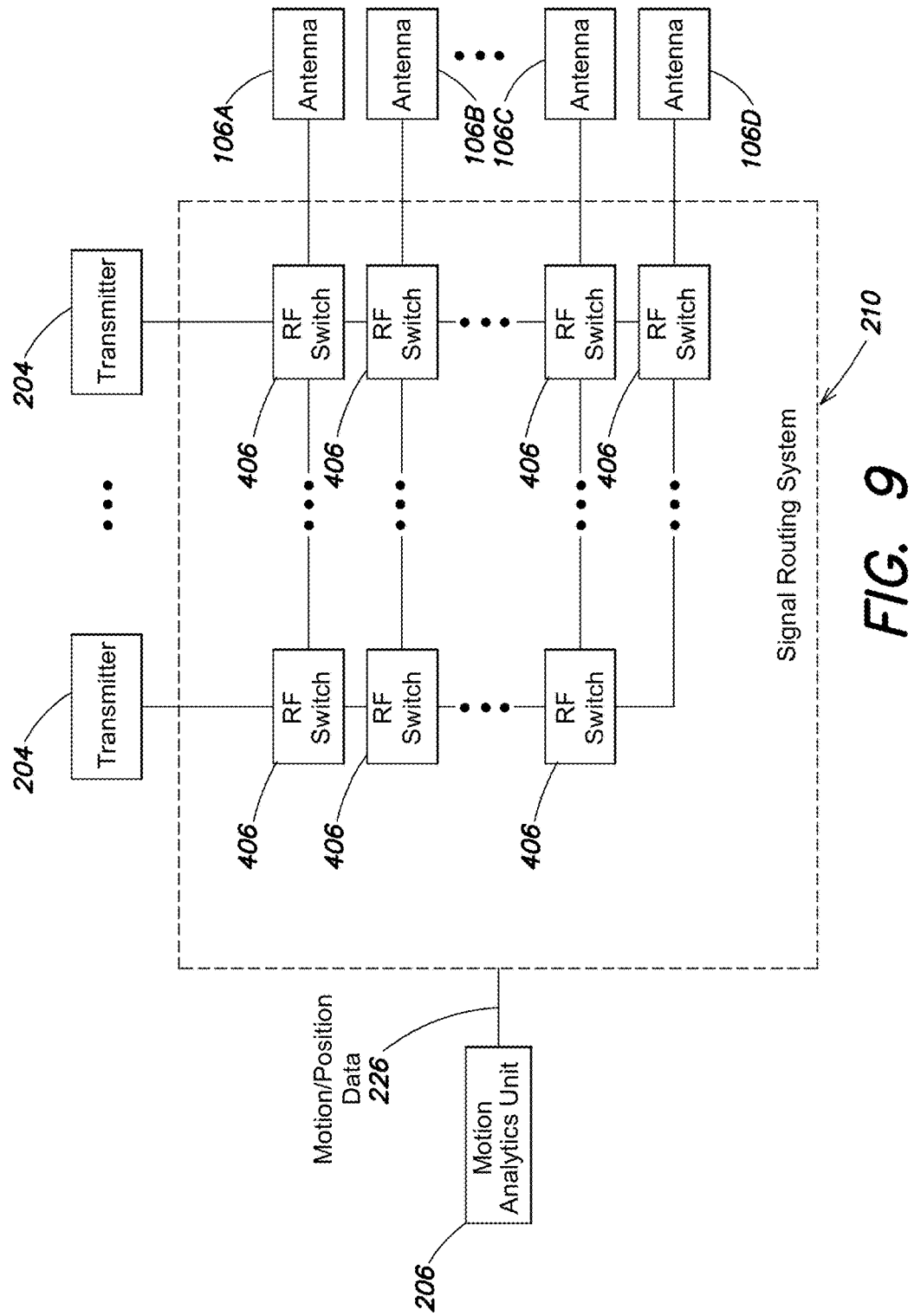
FIG. 9 shows an example implementation of a signal routing system, according to some embodiments.

It is noted that the signal routing system 210 may dynamically route the Tx/Rx RF signal 312 to the plurality of antennas 106 by in any of a number of ways, without relying on the DOTS architecture described above. For example, the signal routing system 210 may utilize an RF switching network, such as that depicted in FIG. 9. A plurality of transmitters 204 (or RRHs 304 or other source of Tx/Rx RF Signal) is communicatively coupled to a plurality of antennas 106 by way of a plurality of RF switches 406 and/or combiners (hereafter referred to jointly as switches). The plurality of RF switches 406 are configured such that any individual transmitter 204 may be positively connected to any one or more antennas 106. The signal routing system 210 may process the motion and/or position related data 226 from the motion analytics unit 206 or network and radio data 216 from the transmitters 204 to determine the optimal switch settings in real time to achieve the desired mapping of transmitters 204 to antennas 106. In such a manner, the same degrees of control and optimization described above may be exercised in the present embodiment.

Figure 10:
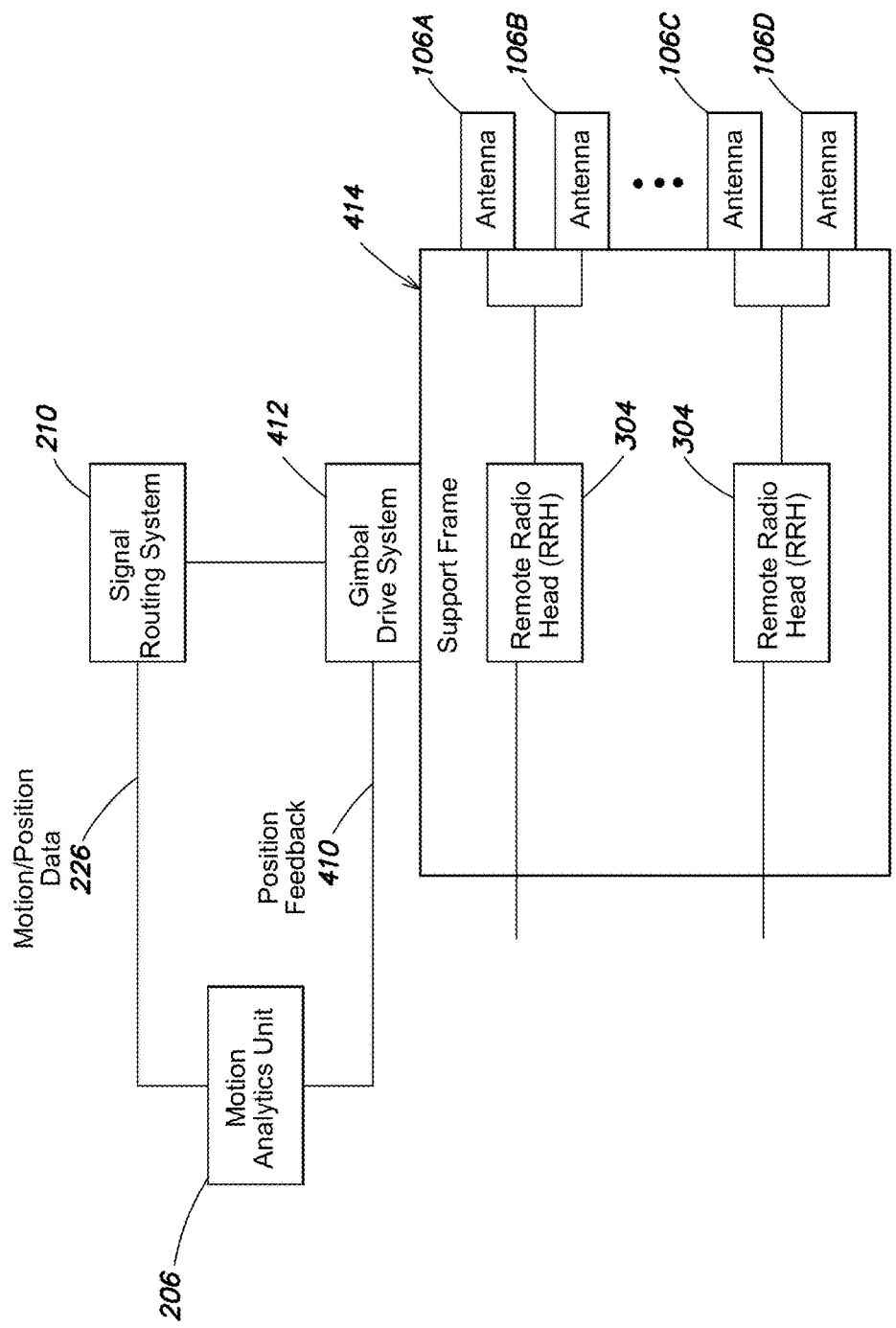
FIG. 10 shows an example implementation of a gimbal drive system coupled with an example signal routing system, according to some embodiments.

In some embodiments, the antennas 106 and/or RRHs 304 and/or DOTS Decoders 404 may be mounted on a support frame 414 coupled to a gimbal drive system 412 capable of rotating the support frame 414 about at least one axis of rotation, as depicted in FIG. 10. The gimbal drive system 412 may utilize motion related data 226 from the motion analytics unit 206 to determine the appropriate gimbal actuation so as to maintain a substantially stationary alignment of the antennas 106 with respect to the coverage area 500. The gimbal drive system 412 may further measure its position or motion and provide a position feedback 410 signal to the motion analytics unit 206 for the purpose of closing the loop on the gimbal position control. Such a system would serve to minimize the handovers experienced by the plurality of users in the coverage area 500. It is appreciated that such a gimbal drive system may be used in concert with any of the previously described embodiments to further enhance the performance of the communication system.

Additionally (or alternatively), one or more of the plurality of antennas may be variable geometry antennas. These variable geometry antennas may be, for example, controlled by the signal routing system using various information (such as network information and/or motion related information). Variable geometry antennas may be, for example, antennas that comprise one or more movable components that change at least one characteristic of a beam emitted by the antenna (e.g., a shape of the beam, a size of the beam, and/or a direction of the beam). The signal routing system may, for example, control a variable geometry antenna to move the emitted beam in concert with movement of a subscriber to stop a hand-off from occurring.

It is noted that, while some of the embodiments presented above may incorporate elements that are particular to specific communication protocols, such as LTE, the invention is intended to operate independent of any specific communication protocol, and may be equally applied to any communication protocol, such as UMTS, GSM, 5G, WiFi, and WiMax.

Example Coverage Area Sectorization Strategies

The coverage area of the communication stations disclosed herein may be substantially larger than conventional cell towers. This large coverage area may be divided into multiple smaller sectors that may be individually assigned telecommunication equipment. Thereby, telecommunication equipment may be dynamically allocated to different portions of the coverage area. Various sectorization strategies may be employed to divide the large coverage area. For example, the large coverage area may be divided into sections that are concentric circles and rings. An example of such a sectorization scheme is shown by coverage area 500 in FIG. 11. As shown, the coverage area 500 includes an inner sector 504, an intermediate sector 506, a perimeter sector 508, and an overflow sector 510.

The inner sector 504 may be a coverage area that is directly below the structure (e.g., structure 110 in FIG. 1). The coverage in the inner sector 504 may be provided by, for example, an omnidirectional antenna. The intermediate sector 506 may be a coverage area with a ring shape that fits around the inner sector 504. The perimeter sector 508 may be a coverage area with a larger ring shape that fits around both the inner and intermediate sectors 504 and 506, respectively. The overflow sector 510 may be a coverage area with a still larger ring shape that fits around the inner, intermediate, and perimeter sectors 504, 506, and 508, respectively. Each of the intermediate, perimeter, and overflow sectors may be formed by a plurality of directional antennas that cover, for example, a portion of the ring shape.

Dividing the coverage area 500 into multiple concentric circles may be particularly advantageous in scenarios where the structure (e.g., the structure 110) rotates. For example, the structure may be an aerostat that rotates as the wind changes direction. In these scenarios, a subscriber in a given sector may remain within the same sector as the structure rotates because of the circular nature of the coverage areas. For example, a stationary subscriber may be in the perimeter sector 508. In this example, the structure may rotate and the stationary subscriber may remain within the perimeter sector 508. Thereby, unnecessary handoffs between sectors may be reduced (or eliminated) due to rotations of the structure.

Figure 11:
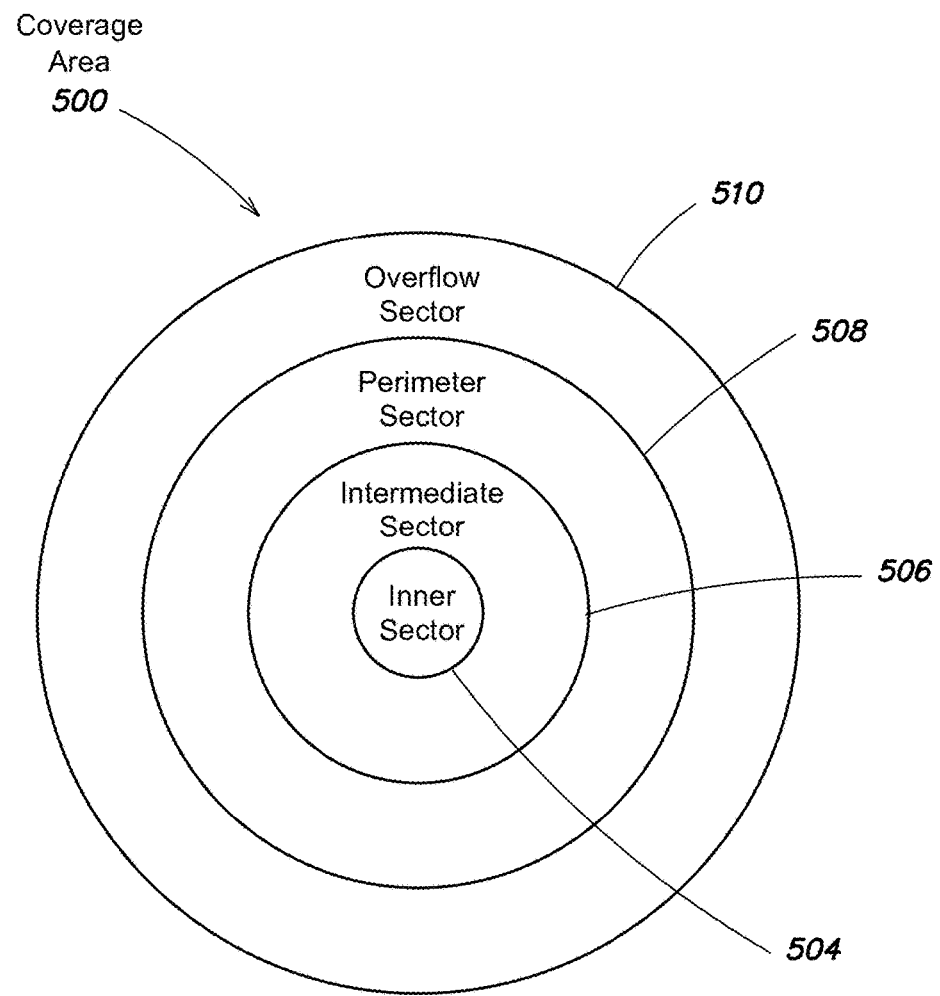
FIG. 11 shows an example coverage area, according to some embodiments.
Figure 12:
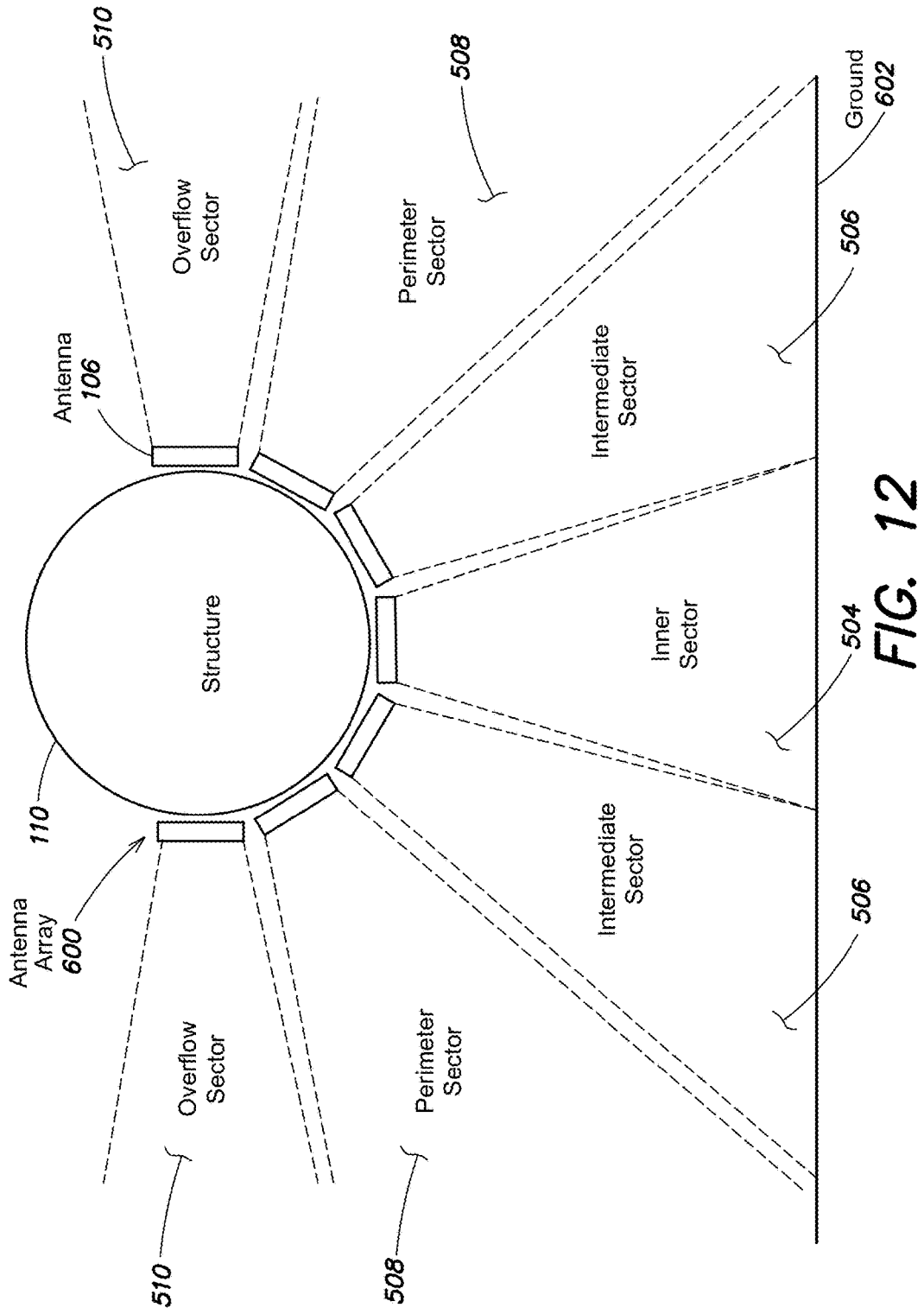
FIG. 12 shows an example antenna array suitable to create the coverage area shown in FIG. 4, according to some embodiments.

As discussed above, the coverage area may be divided into sectors that form multiple concentric circles. This sectorization of the coverage area may be achieved through various antenna array configurations. An example antenna array configuration that is suitable to form the sectors shown in FIG. 11 is shown by antenna array 600 in FIG. 12. As shown, the antenna array 600 includes a plurality of antennas 106 mounted to the structure 110 that forms the inner, intermediate, perimeter, and overflow sectors 504, 506, 508, and 510, respectively, on the ground 602.

As shown, the antenna array 600 includes seven antennas arranged around a portion of the structure 110 and each configured to provide coverage to a particular sector. The illustrated portion of the structure 110 may be, for example, a portion of tower and/or an envelope of an aerostat. The antenna 106 that is configured to provide coverage to the inner sector 504 may be, for example, an omnidirectional antenna so as to form a circular coverage area on the ground 602. Thereby, the illustrated antenna 106 that is configured to provide coverage to the inner sector 504 may provide coverage to the entire inner sector 504. The remaining antennas 106 may be directional antennas that provide coverage to a portion of a given sector. For example, the antennas 106 configured to provide coverage to the intermediate sector 506 may each provide coverage to a trapezoidal portion of the intermediate sector 506. Thereby, additional antennas 106 that are not illustrated may be employed to cover the entire intermediate sector 506.

In some embodiments, the gain applied to the antennas 106 in the antenna array 600 is not uniform. For example, the antennas 106 that provide service to the perimeter sector 508 have a longer line-of-sight path to subscribers on the ground 602 relative to the antennas 106 that provide service to the inner sector 504. In these embodiments, the gain of each antenna 106 may vary based on the line-of-sight distance between the respective antenna 106 and subscribers on the ground. For example, the antenna 106 that provides service to the inner sector 504 may have a low gain, the antennas 106 that provide service to the intermediate sectors 506 may have a medium gain, and the antennas 106 that provide service to the perimeter and overflow sectors 508 and 510, respectively, may have a high gain. The different gain levels for the antennas 106 may be achieved through any of a variety of methods. For example, the antennas 106 that are configured to provide a medium gain may be constructed differently relative to the antennas 106 that provide a high gain. Alternative (or additionally), the RF signals provided to the antennas may be amplified to achieve the different gains. For example, the RF signal applied to the antennas 106 that provide a high gain signal may be larger in magnitude than the RF signal applied to the antennas 106 that provide a medium gain signal.

As discussed herein, telecommunication equipment may be dynamically allocated between sectors such as between the inner sector 504 and the intermediate sector 506. In some embodiments, the telecommunication equipment may further be completely disconnected from one or more sectors to turn off a sector (or portion of a sector). Turning off sectors may be advantageous in situations where one or more of the antennas 106 are not aimed at subscribers due to, for example, movement of the structure. For example, the antennas 106 that provide service to the overflow sector may be aimed at (or above) the horizon. In this example, the overflow sector 510 may be turned off during situations when the structure 110 is not rotated and turned on during situations where the structure 110 has rotated (e.g., rotated clockwise or rotated counterclockwise in FIG. 12). Thereby, the coverage area on the ground may remain relatively constant despite movement of the structure 110. An example of such a dynamic allocation of telecommunication equipment to compensate for movement of the structure is shown by coverage configurations 700A and 700B in FIGS. 13A and 13B. In particular, FIG. 13A shows a coverage configuration 700A when the structure is in a neutral position and FIG. 13B shows a coverage configuration 700B when the structure is in a rotated (or rolled) position.

Figure 13A:
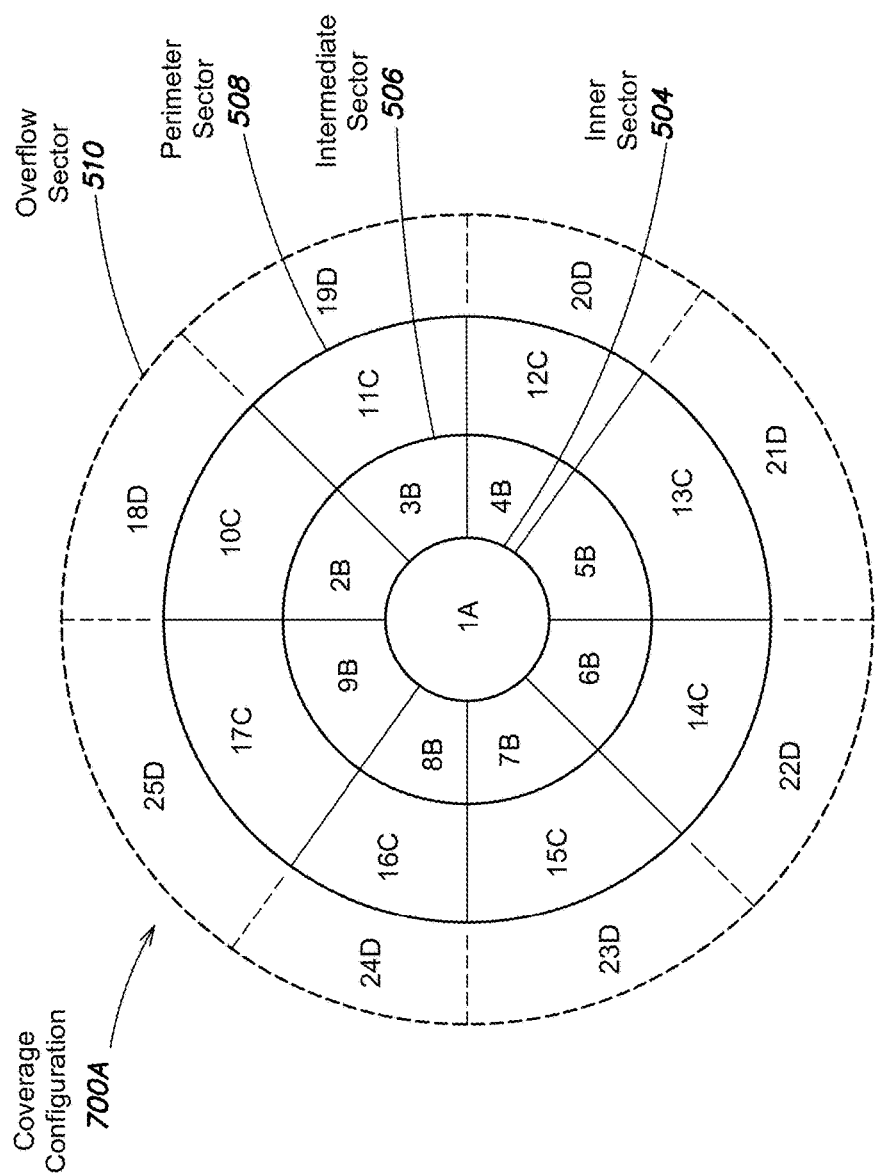
FIG. 13A shows an example coverage configuration, according to some embodiments.
Figure 13B:
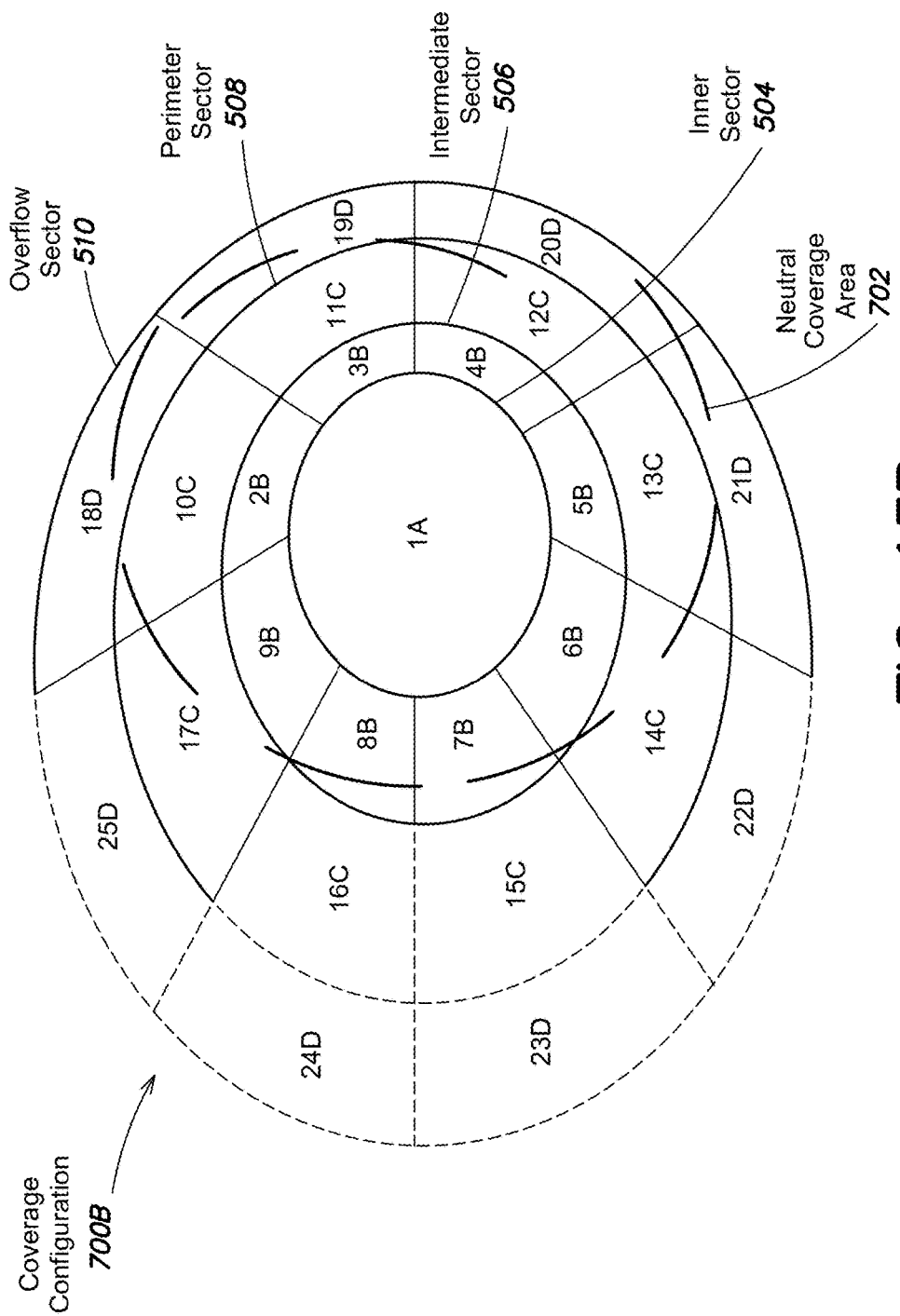
FIG. 13B shows another example coverage configuration, according to some embodiments.

In FIGS. 13A and 13B, each region is illustrated with either solid lines or dashed lines and is labeled with a letter following a number. The regions illustrated in dashed lines are turned off while the regions illustrated with solid lines are turned on. In the labels, the letter is representative of the sector and the number is representative of the particular antenna (or antenna array). As shown, A is representative of the inner sector 504, B is representative of the intermediate sector 506, C is representative of the perimeter section 508, and D is representative of the overflow section 510. For example, a first antenna (or array) is providing service to region 1A, a second antenna (or array) is providing service to region 2B, and a third antenna (or array) is providing service to region 3B.

FIG. 13A shows an example coverage area 700A where the structure is in a neutral position. As shown, all of the regions in the inner, intermediate, and perimeter sectors 504, 506, and 508 are turned on while all of the regions in the overflow sector 510 are turned off. Thereby, a communication station employing the coverage configuration 700A may provide telecommunication services to subscribers within the inner, intermediate, and perimeter sectors 504, 506, and 508.

FIG. 13B shows another example coverage configuration 700B where the structure is in a rotated (or rolled) position. As shown, the sectors are now elliptical in shape (as opposed to circular). Relative to the coverage configuration 700A, the coverage configuration turns on regions 18D-21D of the overflow sector 510 and turns off regions 15C and 16C of the perimeter sector 508. The result is a similar coverage area relative to the coverage configuration 700A shown in FIG. 13A so as to provide uninterrupted service to subscribers on the ground regardless of the movement of the structure. For illustration, the coverage provided in FIG. 13A is shown as the neutral coverage area 702 that is overlaid onto the coverage configuration 700B.

It should be appreciated that an antenna array comprising a plurality of antennas may be employed to provide coverage to any particular region shown in FIGS. 13A and/or 13B. Thereby, the regions may be further subdivided into smaller areas. As shown in FIG. 14, the region 6B may be subdivided into six areas 802. The telecommunications service in each of the areas 802 in region 6B may be provided by, for example, an antenna in an antenna array that is providing service to the region 6B.

Figure 15:
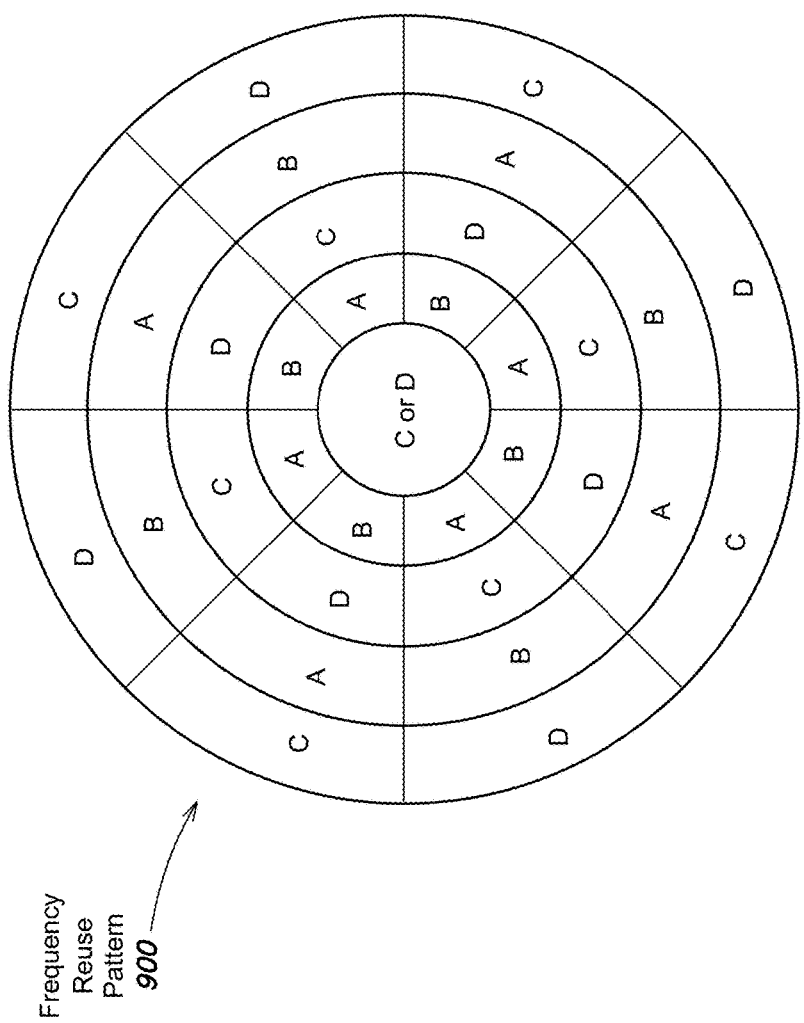
FIG. 15 shows an example frequency reuse pattern, according to some embodiments.

In some embodiments, the regions and/or sectors shown in FIGS. 13A, 13B and 14 may each use a different frequency (either different band or different channels within the same band) to provide telecommunication services to subscribers. Using different frequencies may reduce interference between regions and/or sectors. For example, each sector may use one frequency of a set of different frequencies and be arranged such that no two touching sectors use the same frequency. Thereby, frequencies may be reused within the coverage area while still reducing interference between sectors. An example of such a frequency reuse pattern is shown in FIG. 15 by frequency reuse pattern 900. As shown, the frequency reuse pattern 900 assigns one of four frequencies (A, B, C, or D) to each region. The assignment is arranged such that no two regions that share a boundary use the same frequency. It should be appreciated that the frequency reuse pattern 900 is simply one possible implementation and various other patterns may be employed.

Figure 16:
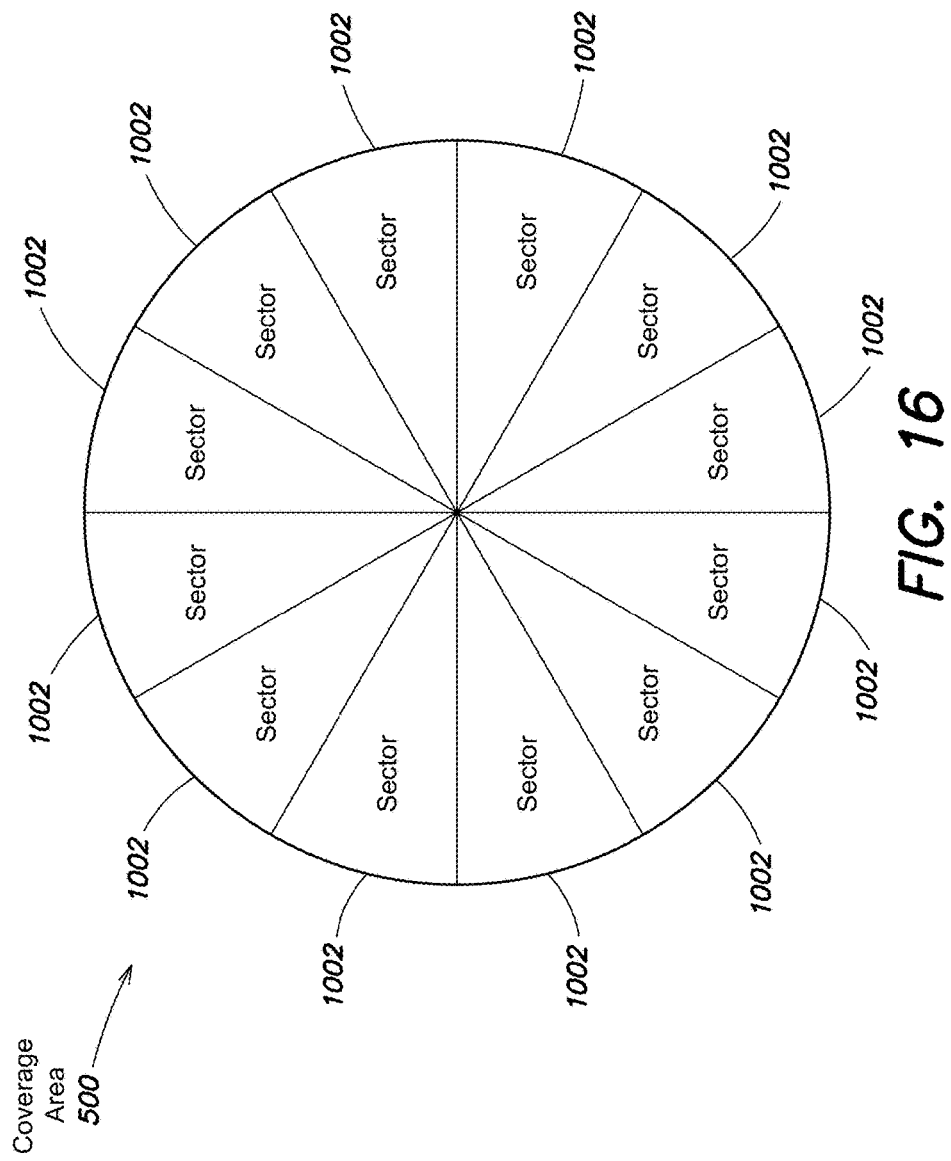
FIG. 16 shows another example coverage area, according to some embodiments.

In some embodiments, the coverage area of the communication station may be divided into two half circles or three or more wedge shaped sections. An example of such a sectorization scheme is shown in FIG. 16. As shown, the coverage area 1000 includes twelve sectors 1002 that are each constructed as wedges. Each of these sectors may be covered by one or more antennas with dynamic allocation of telecommunication equipment between sectors as described herein. Each of the sectors 1002 may be further subdivided into smaller regions such as the trapezoidal sub-regions described above with reference to FIG. 14.

CONCLUSION

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced other than as specifically described. In addition, any combination of two or more features, systems, articles, materials, and/or methods described herein, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A wireless communication station configured to provide a wireless network for one or more subscribers, comprising:
    a plurality of antennas that are co-located and configured to provide coverage for the one or more subscribers within a coverage area comprising a plurality of sectors, each of the plurality of antennas being configured to provide coverage for the one or more subscribers within at least one sector of the plurality of sectors;
    a plurality of transmitters each being configured to communicate with an external system and generate an RF signal; and
    a signal routing system coupled between the plurality of transmitters and the plurality of antennas, the signal routing system being configured to dynamically assign the plurality of transmitters to the plurality of sectors at least in part by dynamically routing the RF signal from any one of the plurality of transmitters to any one of the plurality of antennas,
    wherein the signal routing system is configured to receive motion information indicative of a motion of the plurality of antennas and dynamically assign the plurality of transmitters to the plurality of sectors using the motion information.

2. The wireless communication station of claim 1, wherein at least one of the plurality of antennas is a variable geometry antenna and wherein the signal routing system is configured to control the variable geometry antenna using the motion information.

3. The wireless communication station of claim 1, further comprising a gimbal drive mechanism configured to rotate at least one of the plurality of antennas about at least one axis and wherein the signal routing system is configured to control the gimbal mechanism using the motion information.

4. The wireless communication station of claim 1, wherein at least one of the plurality of antennas is a variable geometry antenna and wherein the signal routing system is configured to control the variable geometry antenna.

5. The wireless communication system of claim 4, wherein the signal routing system is configured to control the variable geometry antenna to change a characteristic of at least one sector of the plurality of sectors, the characteristic of the at least one sector being selected from the group consisting of: a size of the at least one sector, a shape of the at least one sector, and a position of the at least one sector.

6. The wireless communication station of claim 4, wherein the signal routing system is configured to receive subscriber information indicative of a movement of a subscriber of the one or more subscribers and control the variable geometry antenna using the subscriber information.

7. The wireless communication station of claim 1, wherein the signal routing system is configured to receive network information indicative of at least one state of the wireless network and dynamically assign the plurality of transmitters to the plurality of sectors using the network information.

8. The wireless communication station of claim 7, wherein the at least one state of the wireless network comprises a state selected from the group consisting of: a number of subscribers in at least one sector of the plurality of sectors, a number of transmitters assigned to the at least one sector, a total number of subscribers on the wireless network, an average data throughput, a sector handover rate, a rate at which subscribers are being added to the wireless network, a rate at which subscribers are leaving the wireless network, a modulation scheme employed by the wireless network, a performance of at least one component of the wireless communication system, and a resource block allocation.

9. The wireless communication station of claim 1, wherein the signal routing system comprises:
    a signal routing controller configured to identify a mapping of at least one transmitter of the plurality of transmitters to at least one antenna of the plurality of antennas and generate a control signal based on the identified mapping; and
    a signal routing actuator configured to dynamically route the RF signal from at least one transmitter of the plurality of transmitters to at least one antenna of the plurality of antennas based on a received control signal.

10. The wireless communication station of claim 9, wherein the at least one antenna is a multi-beam antenna configured to generate a plurality of RF beams and wherein the signal routing controller is configured to identify the mapping at least in part by identifying a mapping between the at least one transmitter to at least one RF beam of the plurality of RF beams.

11. The wireless communication station of claim 9, wherein the signal routing actuator is configured to dynamically route the RF signal at least in part by converting the RF signal into an optical signal, transmitting the optical signal over an optical fiber, and recovering the RF signal from the optical signal.

12. The wireless communication station of claim 9, wherein the signal routing controller is configured to receive motion information indicative of a motion of the plurality of antennas and identify the mapping using the motion information.

13. The wireless communication station of claim 12, further comprising a motion analytics unit configured to receive an output of at least one motion sensor and generate the motion information using the output of the at least one motion sensor.

14. The wireless communication station of claim 9, wherein the signal routing controller is configured to receive network information indicative of a number of subscribers in at least one of the plurality of sectors and identify the mappings using the network information.

15. The wireless communication station of claim 1, wherein the signal routing system comprises a transport system configured to receive a plurality of RF signals comprising the RF signal from each of the plurality of RF transmitters, add an address to each of the plurality of RF signals indicative of one or more antennas of the plurality of antennas that are assigned to transmit the respective RF signal, and provide the plurality of RF signals to at least some of the plurality of antennas using the address associated with each of the plurality of RF signals.

16. The wireless communication station of claim 15, wherein the transport system is a dense optical transport system (DOTS) comprising:
    a DOTS head end configured to receive the plurality of RF signals and generate an optical signal from the plurality of RF signals and the address associated with each of the plurality of RF signals; and
    a plurality of DOTS decoders each configured to receive the optical signal, recover an RF signal from the optical signal based on the address associated with one or more of the plurality of RF signals, and provide the recovered RF signal to an antenna from the plurality of antennas.

17. The wireless communication station of claim 1, wherein a first subset of the plurality of antennas have a first gain value and a second subset of the plurality of antennas have a second gain value that is higher than the first gain value.

18. The wireless communication station of claim 1, further comprising a structure having a height of at least 100 meters and wherein the plurality of antennas are mounted on the structure at a height of at least 100 meters above ground.

19. The wireless communication station of claim 18, wherein the structure includes:
an aerostat including an envelope constructed to hold a lighter than air gas; and
a mooring station coupled to the aerostat by at least one tether and including at least one winch to adjust a height of the aerostat above the ground.

20. A wireless communication system comprising:
a plurality of antennas that are co-located and configured to provide coverage for one or more subscribers within a coverage area;
a plurality of transmitters each being configured to communicate with an external system and generate an RF signal; and
a signal routing system coupled between the plurality of transmitters and the plurality of antennas, the signal routing system being configured to dynamically assign the plurality of transmitters to the plurality of antennas and comprising a transport system configured to receive a plurality of RF signals comprising the RF signal from each of the plurality of RF transmitters, add an address to each of the plurality of RF signals indicative of one or more antennas of the plurality of antennas that are assigned to transmit the respective RF signal, and provide the plurality of RF signals to at least some of the plurality of antennas based on the address associated with one or more of the plurality of RF signals.

21. The system of claim 20, wherein the transport system is a dense optical transport system (DOTS) comprising:
a DOTS head end configured to receive the plurality of RF signals and generate an optical signal from the plurality of RF signals and the address associated with each of the plurality of RF signals; and
a plurality of DOTS decoders each configured to receive the optical signal, recover an RF signal from the optical signal based the address associated with one or more of the plurality of RF signals, and provide the recovered RF signal to an antenna from the plurality of antennas.

* * * * *